United States Patent
Hiromi et al.

(10) Patent No.: US 6,579,183 B1
(45) Date of Patent: Jun. 17, 2003

(54) VIDEO GAME SYSTEM, A VIDEO GAME DISPLAY METHOD AND A READABLE STORAGE MEDIUM STORING A VIDEO GAME DISPLAY PROGRAM

(75) Inventors: Akinori Hiromi, Habikino (JP); Tetsuya Kondo, Nara (JP)

(73) Assignee: Konami Corporation, Tokyo-to (JP)

( * ) Notice: Subject to any disclaimer, the term of this patent is extended or adjusted under 35 U.S.C. 154(b) by 0 days.

(21) Appl. No.: 09/621,753

(22) Filed: Jul. 24, 2000

(30) Foreign Application Priority Data

Jul. 26, 1999 (JP) .......................................... 11-211014

(51) Int. Cl.$^7$ ................................................ A63F 13/00
(52) U.S. Cl. .............................. 463/30; 463/31; 463/36
(58) Field of Search ................................ 463/9, 30, 31, 463/34, 35, 36, 37, 43, 47; 345/127–131, 141, 337, 338

(56) References Cited

U.S. PATENT DOCUMENTS

| | | | |
|---|---|---|---|
| 5,377,997 A | | 1/1995 | Wilden et al. |
| 5,393,073 A | * | 2/1995 | Best ................................ 463/1 |
| 5,897,437 A | * | 4/1999 | Nishiumi et al. .............. 463/47 |
| 5,943,049 A | * | 8/1999 | Matsubara et al. .......... 345/715 |
| 6,010,405 A | * | 1/2000 | Morawiec .................... 345/501 |
| 6,168,524 B1 | * | 1/2001 | Aoki et al. .................... 463/31 |
| 6,232,966 B1 | * | 5/2001 | Kurlander .................... 345/764 |

FOREIGN PATENT DOCUMENTS

| | | |
|---|---|---|
| CN | 1205905 A | 1/1999 |
| EP | 0742535 | 11/1996 |
| EP | 0844010 | 5/1998 |
| JP | 11-126014 | 5/1999 |
| JP | 11-154048 | 6/1999 |
| TW | 87111373 | 2/1999 |

OTHER PUBLICATIONS

Everhardt S P et al: "Omar a haptic display for speech perception by deaf and deaf–blind individuals" Virtual Reality Annual International Symposium, 1993., 1993 IEEE Seattle, WA, USA Sep. 18–22, 1993, New York, NY, USA, IEEE, Sep. 18 1993 pp. 195–201, XP010130491 ISBN: 0–7803–1363–1 p. 199, paragraph 3.

* cited by examiner

*Primary Examiner*—Jessica Harrison
*Assistant Examiner*—Aaron L Enatsky
(74) *Attorney, Agent, or Firm*—Jordan and Hamburg LLP

(57) ABSTRACT

A sentence display control device displays sentences representing contents of speeches of human characters who appear in a game and imitating sounds relating to the contents of speeches in a game content display frame of a monitor. A vibration control device vibrates a vibration pack when the vibration pack is mounted on a controller. A display mode changing device successively enlarges the sizes of the respective characters of a sentence representing the content of the game displayed in the game content display frame when a specific character display is executed and then reduces them to an initial size. A link control device links a change of a display mode by the display mode changing device and driving of the vibration pack. Accordingly, the contents of speeches of the characters who appear in the game can be displayed in an emphasized manner to a game player, thereby making the video game more interesting.

15 Claims, 34 Drawing Sheets

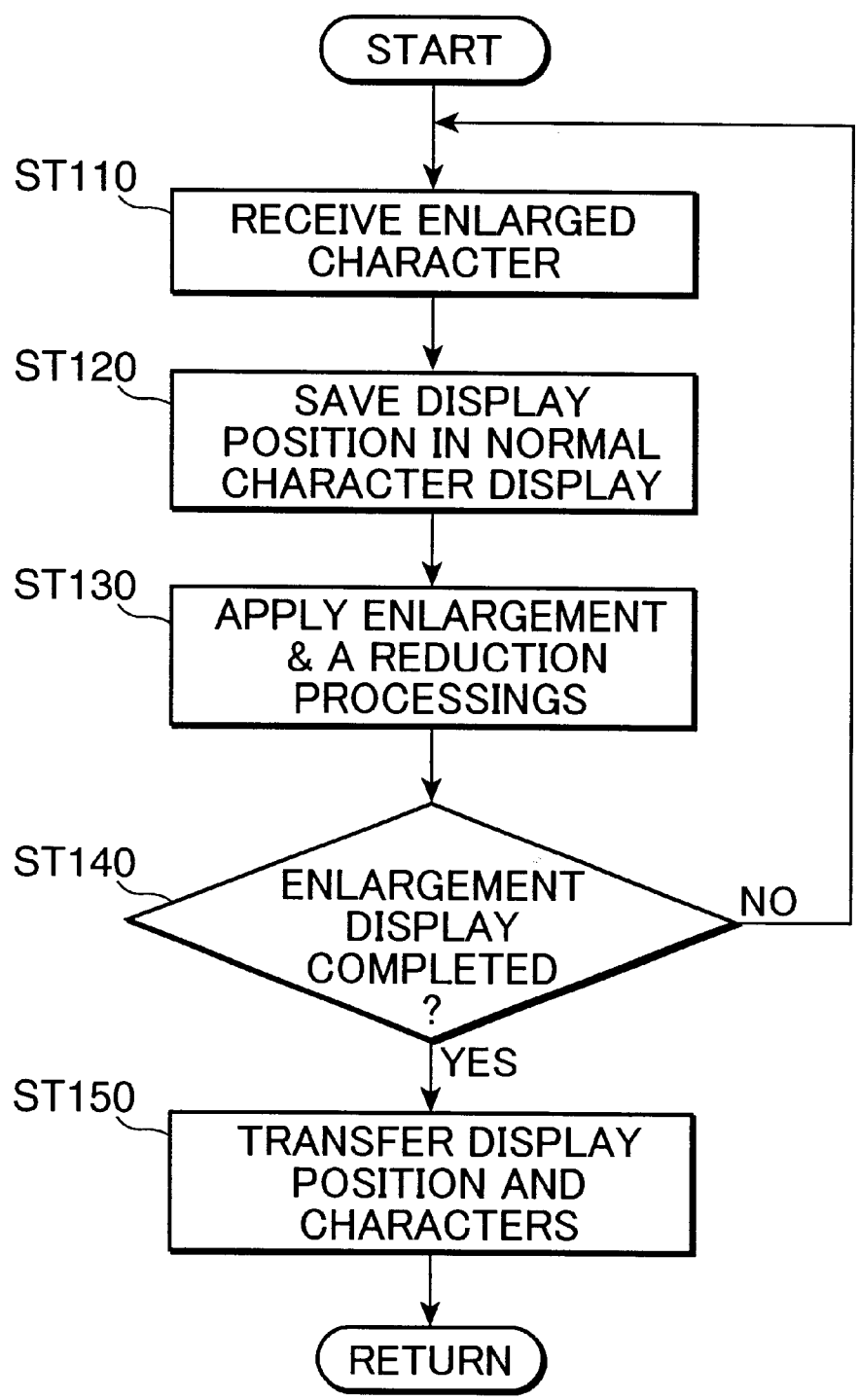

VIDEO GAME SYSTEM, A VIDEO GAME DISPLAY METHOD AND A READABLE STORAGE MEDIUM STORING A VIDEO GAME DISPLAY PROGRAM

The present invention relates to a character displaying technique in a video game using an optical disk, a magnetic disk, a semiconductor disk or like storage medium storing a program data.

BACKGROUND OF THE INVENTION AND RELATED ART STATEMENT

Quite a few video game systems have been proposed. These video systems include systems comprised of a special apparatus for home use and a television monitor and systems comprised of a special apparatus for commercial use, a personal computer or a workstation, a display and a sound output device. Any one of these systems is provided with a controller operated by a game player, a storage medium storing a game program data, a CPU for executing controls to generate sounds and images based on the game program data, an image processor for generating images, an audio processor for generating sounds, a CRT monitor for displaying images, and a loudspeaker for making the sounds audible. CD-ROMs, semiconductor memories, cassettes containing built-in semiconductor memories, etc. are frequently used as the storage medium.

Various kinds of video games of this type are known. In simulation games, as one kind of these video games, in which a game progresses in accordance with a scenario set beforehand, games are known in which sentences of e.g. 3 to 4 lines representing contents of speeches of human characters who appear on the monitor and related imitation sounds are displayed in a character display section provided in a specified position of a monitor screen. In such games, the flow of sentence is expressed by displaying the characters one by one in the character display section for, e.g. each frame.

However, in the conventional video games, lines or speeches of the human characters are merely expressed by characters. None of them has tried to draw the game player's attention by changing a display mode of the characters. On the other hand, controllers operated by game players while being held in their hands have been recently fitted with a vibration member. Vibration is given to the game player's hands by driving the vibration member depending on the progress of the game, thereby making the game more interesting.

SUMMARY OF THE INVENTION

In view of the above situation, an object of the present invention is to provide a video game system, a video game display method and a readable storage medium storing a game program which are designed to display contents of speeches of characters in an emphasizing manner to a game player by linking vibration of a vibration member and a change of a character display mode.

The present invention is directed to a video game system in which a game progresses in accordance with a preset scenario, comprising a display means for displaying game screens, a sentence storage means for storing various sentences representing contents of the game in compliance with the scenario, a sentence display control means for displaying sentences in the form of characters on the display means to thereby express the progress of the contents of the game, a display mode changing means for changing a display mode of characters to be displayed on the display means when a specific character display is executed by the sentence display control means, a vibrating member mounted on an operable means to be held by a game player, a vibration control means for vibrating the vibrating member, and a link control means for linking a change of the display mode of the character display and vibration of the vibrating member.

In the video game system thus constructed, various sentences representing the contents of the game in compliance with the scenario are stored, the progress of the contents of the game is expressed by displaying the sentences in characters on the display means, and the display mode of the characters on the display means is changed when the specific character display is executed. Further, the content of the game corresponding to the displayed sentence can be emphasized by linking the change of the display mode of the characters and the vibration of the vibrating member mounted on the operable means held by the game player, with the result that the video game can be made more interesting.

These and other objects, features and advantages of the present invention will become more apparent upon reading the following detailed description along with the accompanied drawings.

BRIEF DESCRIPTION OF THE DRAWINGS

FIG. 34 is a flow chart showing a procedure of a character enlargement display by the display mode changing means.

DETAILED DESCRIPTION OF THE PREFERRED EMBODIMENTS OF THE INVENTION

Figure 1:
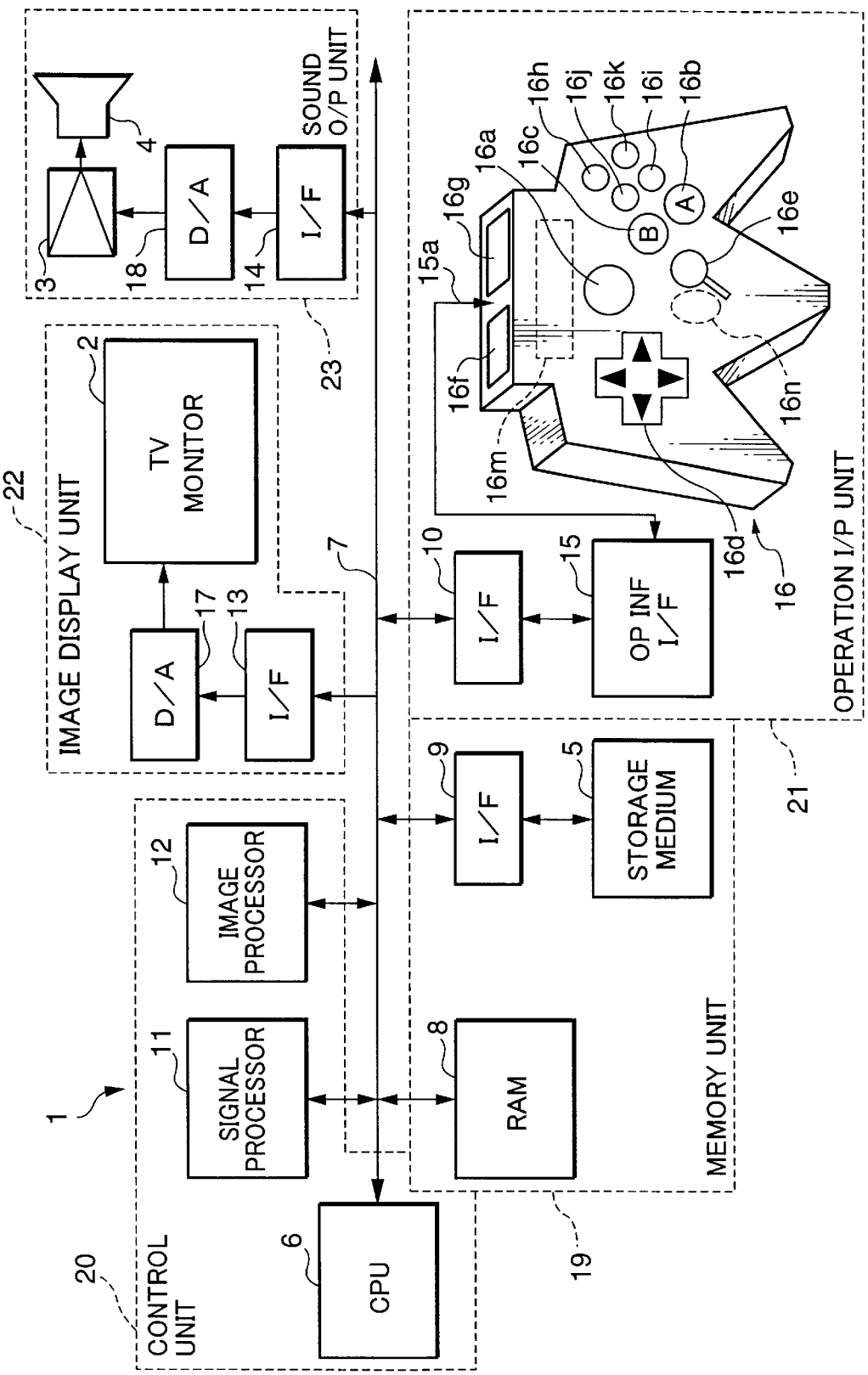
FIG. 1 is a block diagram of a game system according to one embodiment of an inventive video game system.

FIG. 1 is a block diagram of a video game system 1 according to one embodiment of an inventive video game system.

A video game system 1 is comprised of a main game unit, a television monitor (hereinafter, merely "monitor") 2 as a display means for outputting images of a game, an amplifying circuit 3 and a loudspeaker 4 for outputting sounds of the game, and a storage medium 5 storing a game data including image data, sound data and a program data. The storage medium 5 is, for example, a so-called ROM cassette in which a ROM or the like storing the game data, a program data of an operating system is contained in a plastic casing, an optical disk, or a flexible disk.

The main game unit is constructed by connecting a bus 7 comprised of an address bus, a data bus and a controller bus to a CPU 6, connecting a RAM 8, interface circuits 9 and 10, a signal processor 11, an image processor 12, and interface circuits 13 and 14 to the bus 7, respectively, connecting a controller 16 to the interface circuit 10 via an operational information interface circuit 15, connecting a digital-to-analog (D/A) converter 17 to the interface circuit 13 and connecting a D/A converter 18 to the interface circuit 14.

A memory unit 19 is constructed by the RAM 8, tile interface circuit 9 and the storage medium 5. A control unit 20 for controlling the progress of the game is constructed by the CPU 6, the signal processor 11 and the image processor 12. An operational input unit 21 is constructed by the interface circuit 10, the operational information interface circuit 15 and the controller 16. An image display unit 22 is constructed by the monitor 2, the interface circuit 13 and the D/A converter 17. A sound output unit 23 is constructed by the amplifying circuit 3, the loudspeaker 4, the interface circuit 14 and the D/A converter 18.

In the case that the storage medium 5 is, for example, a ROM cassette, the RAM 8 may be integrally accommodated in the plastic case of the storage medium 5.

The signal processor 11 is mainly adapted for the calculation in a three-dimensional (3D) space, the calculation to transform a position in the 3D space into the one in a simulated 3D space, the light source calculation, and the generation and processing of sound data.

The image processor 12 is adapted to write an image data in the RAM 8 in accordance with the calculation result of the signal processor 11: for example, to write a texture data in an area of the RAM 8 designated by a polygon.

The controller 16 functions as an operable means operated by a game player while being held by him and includes a start button 16a, an A-button 16b, a B-button 16c, a cross key 16d, a stick-shaped controller 16e, a left trigger button 16f, a right trigger button 16g, a C1-button 16h, a C2-button 16i, a C3-button 16j, a C4-button 16k, and a back (rear) trigger button 16n.

The controller 16 also includes a connector 16m, and a card memory (not shown) made of a nonvolatile memory for, e.g. temporarily storing the progress of the game when the game is interrupted, and a vibration pack (vibration member) 16p (see FIG. 3) for giving vibration to the game player holding the controller 16 are detachably connectable with the connector 16m.

The stick-shaped controller 16e has substantially the same functions as a joystick. Specifically, the stick-shaped controller 16e includes a standing stick and is operable not only to up, down left and right, but in any direction of 360° about a specified position where the stick stands. According to a direction of inclination and an angle of inclination of the stick, values in X-coordinate (lateral direction) and Y-coordinate (forward and backward directions) with the standing position as an origin are sent to the CPU 6 via the interface circuits 15, 10.

In the controller 16, the cross key 16d is, for example, used to move a display position of a cursor for selection and designation in the progress of the game, and the A-button 16a is used to confirm the selection or designation of content corresponding to the display position of the cursor.

This game system 1 has different modes depending upon its application. More specifically, if the game system 1 is constructed to be used at home, the monitor 2, the amplifying circuit 3 and the loudspeaker 4 are separate from the main game unit. If the game system 1 is constructed to be used on a commercial basis, all the parts shown in FIG. 1 are accommodated as a unit in a signal container.

Further, if the game system 1 is constructed using a personal computer or a workstation as a core, the monitor 2 corresponds to a display of the computer; the image processor 12 corresponds to a part of the game program data stored in the storage medium 5 or a hardware on an extension board mounted on an extension slot of the computer; and the interface circuits 9, 10, 13, 14, the D/A converters 17, 18 and the operational information interface circuit 15 correspond to the hardware on the extension board mounted on the extension slot of the computer. Further, the RAM 8 corresponds to a main memory of the computer or the respective areas of an extension memory. In this embodiment, an example in which the game system 1 is constructed to be used at home is described.

Next, the operation of the game system 1 is schematically described. A power switch (not shown) is turned on to apply a power to the game system 1. At this time, the CPU 6 reads image data, sound data and game program data from the storage medium 5 in accordance with an operating system stored in the storage medium 5. A part or all of the read image data, sound data and game program data are stored in the RAM 8.

Thereafter, the CPU 6 progresses a game based on the game program data stored in the RAM 8 and contents of instructions given from a game player via the controller 16. In other words, the CPU 6 suitably generates commands as tasks to output images and sounds based on the contents of instructions given from the game player via the controller 16.

The signal processor 11 performs the calculation of positions of characters in the 3D space (the same applies to the two-dimensional (2D) space), the light source calculation, the sound data generation and processing based on the above commands.

Subsequently, the image processor 12 writes an image data to be imaged in a display area of the RAM 8 based on the calculation result. The image data written in the RAM 8 is fed via the interface circuit 13 to the D/A converter 17, where it is converted into an analog video signal and then fed to the monitor 2 to be displayed on its display surface as an image.

On the other hand, the sound data outputted from the signal processor 11 is fed via the interface circuit 14 to the D/A converter 18, where it is converted into an analog sound signal and then outputted as sounds from the loudspeaker 4 via the amplifying circuit 3.

Next, the writing of the texture data by the image processor 12 is described with reference to FIG. 1.

As described above, the signal processor 11 performs the calculation based on the command of the CPU 6, and the image processor 12 writes the image data in the display area of the RAM 8 based on the calculation result.

The RAM 8 has a non-display frame and a display frame (frame buffer), and polygon data, texture designation data and color data (texture data) and other data stored in the storage medium 5 are stored in the non-display area.

Here, polygons are polygonal 2D virtual figures for constructing objects set in a game space, i.e. models and characters. In this embodiment, the polygons are triangular and rectangular. Textures are 2D images to be pasted to the polygons to construct an image, whereas color data are data for designating the colors of the textures.

The polygon data which are coordinate data of apices of the polygons and the texture designation data for designating the textures corresponding to the polygons are stored together.

Imaging commands generated by the CPU 6 include commands for forming a 3D image using polygons and commands for forming usual 2D images.

The imaging command to form a 3D image using the polygons is comprised of polygon apex address data in the non-display area of the RAM 8, texture address data representing stored positions of texture data to be pasted to the polygons in the RAM 8, color address data representing stored positions of color data indicating the colors of the texture data in the display area of the RAM 8, and luminance data representing the luminance of the textures.

Among these data, the polygon apex address data are obtained as follows. The signal processor 11 applies coordinate transformation and perspective transformation to polygon apex coordinate data in the 3D space from the CPU 6 based on a moving amount data and a rotating amount data of the screen itself (visual point), thereby replacing it by polygon apex coordinate data in the 2D space.

The polygon apex coordinate data in the 2D space represents the addresses in the display area of the RAM 8, and the image processor 12 writes texture data represented by the texture address data allotted beforehand in a range of the display area of the RAM 8 indicated by three or four polygon apex address data. In this way, objects (human character, background, etc.: human characters including soccer players and their friends, and a soccer field in this embodiment) expressed by pasting the textures to the respective polygons are displayed on the display surface of the monitor 2.

Next, the summary of a player growth game which is one of the soccer video games carried out by this game system 1 is described. This soccer video game is provided with various modes such as "J-League", "Tournament", "Tournament among National Teams" and "Training of Player". In the "Training of Player" mode, a rookie soccer player having joined, for example, a youth team of the J-league is reared and trained so as to be promoted to the first team of the same club of the J-league within a specified period on a time axis of the game.

When the "Training of Player" mode is selected, an initialization screen is displayed to register a player if the game is started new. In the initialization, the name of a main character is inputted, his face is selected from a plurality of already available faces, a name of his team is set, his position is set, his height and his stronger leg are inputted. The input and selection results are displayed in corresponding positions of the initialization screen of the monitor 2.

Subsequently, when the game is started, time passes by the week in the game by selecting various speeches and practicing them accordingly by the week. Ability values of the main character, etc. increase and decrease according to the execution results of the selected speeches. The "Training of Player" game mode is over after a judgment as to whether the main character can be promoted to the first team from the youth team is made upon the lapse of a predetermined period, e.g. two and half years in the time axis of the game.

Figure 2:
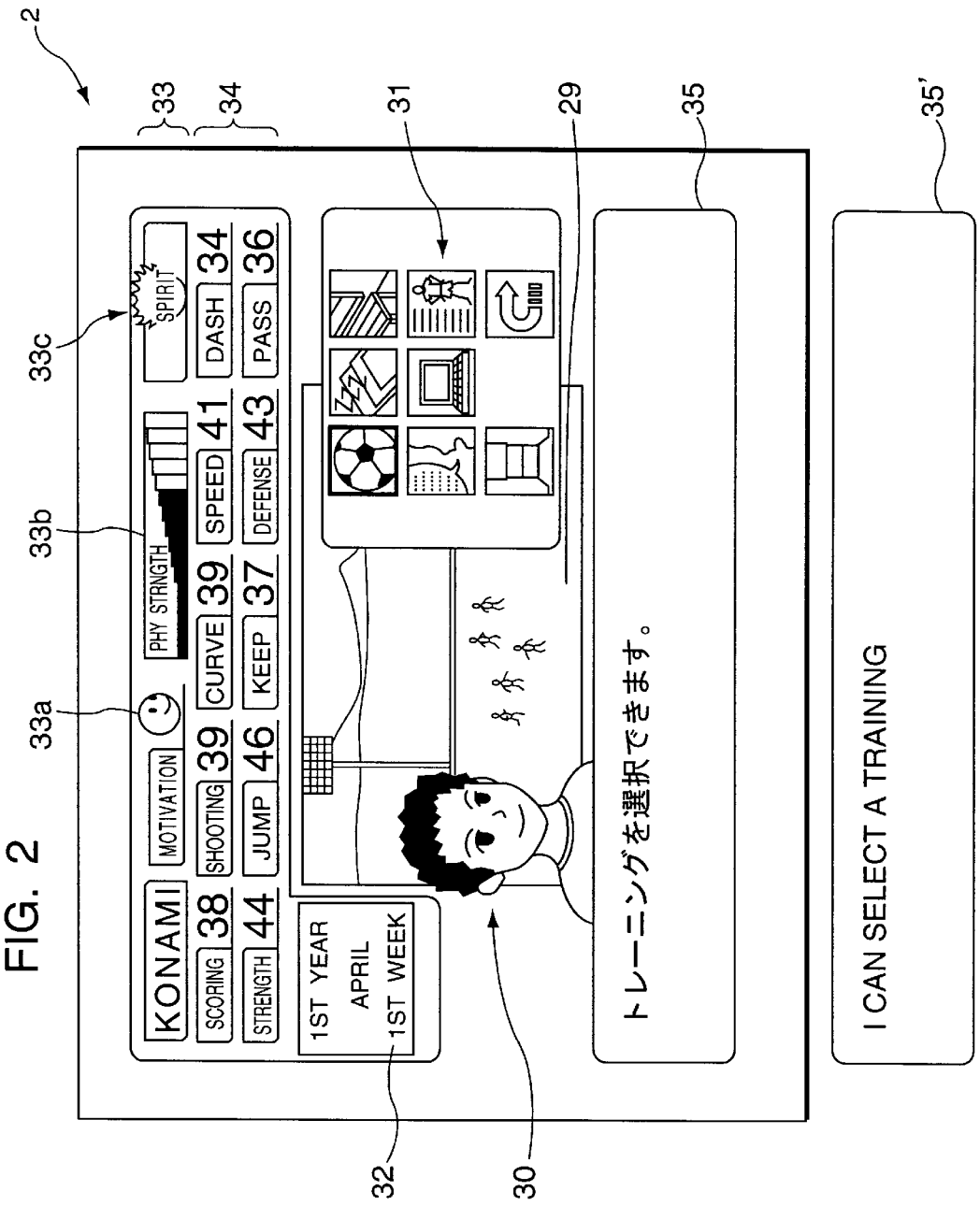
FIG. 2 is a diagram showing a menu screen displayed on a monitor as one screen of "Player Training Mode"

FIG. 2 is a diagram illustrating a menu screen displayed on the monitor 2 as one screen of the "Training of Player" mode. In the menu screen, a soccer field 29 is simulated in the middle, and a face image 30 of the main character is superimposed in a specified position at the left side of the soccer field 29. An icon display area 31 where icons representing selectable commands are arrayed in matrix is set at the right side of the soccer field 29. A date display area 32 where a lapse of time from the enrollment of the main character as a time information of the game is displayed in date, month, year is set at the left end of a central part of the screen. "$1^{st}$ week, April, $1^{st}$ year" is set as an initial value.

Further, a mark display area 33 where a part of the individual data of the main character are displayed is set in an upper part of the screen. In the mark display area 33, a face mark 33a, a physical strength gauge 33b and an enthusiasm mark 33c are displayed from the left. The face mark 33a shows an expression by the eyes and mouth in a circular or a spherical mark to express the main character's will to play soccer. The physical strength gauge 33b expresses the physical strength of the main character by coloring juxtaposed bars. The enthusiasm mark 33c is comprised of a Chinese character "soul" and a flame mark, preferably in color to express the degree of enthusiasm of the main character.

An ability value display area 34 is set immediately below the mark display area 33. In this area 34, "scoring ability", "shooting ability", "curving ability" to curve the shot ball, "speed", "dashing ability", "physical strength", "jumping ability", "ball-keeping ability", "defense ability" and "passing ability" are set at random or fixed numerical values of 1 to 99 and displayed as ability values of the main character as a rookie having just enrolled the team.

A game content display frame (character display frame) 35 is set in the lower half of the screen. This frame 35 is adapted to display 1 to 3 lines of sentences representing contents of speeches of the human characters and imitating sounds which are made in relation to the contents of the speeches so as to guide a progress of the contents of the speeches to the game player. There are cases where sentences are displayed as a guide in a multiple-choice format according to the contents of the speech or the progress thereof. In this case, a desired sentence is selected by the controller 16.

In FIG. 2, the respective icons in the icon display area 31 represent commands "Training", "Rest", "Play", "Speak", "Own Evaluation", "Individual Status", "Option" and "Next Page" from upper left to lower right. Out of these commands, "Training", "Rest", "Speak" are prepared as speech commands. When these commands are selected, one week passes and specified processing is performed by a game progress control means 61 to be described later.

Figure 3:
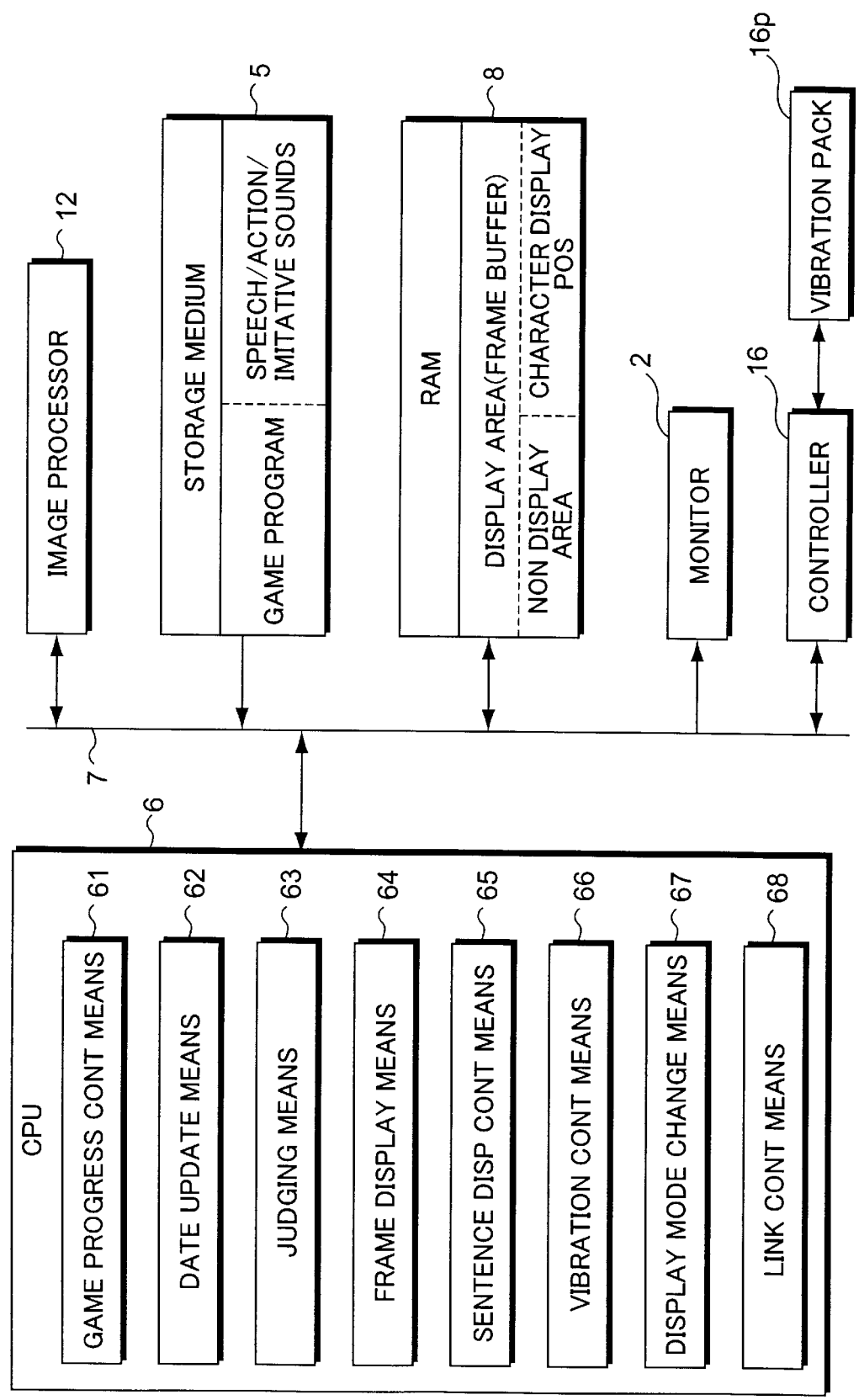
FIG. 3 is a block diagram showing functions of a CPU and part of the devices shown in FIG. 1, FIGS. 4 to 32 are diagrams each showing one screen of a game.
Figure 4:
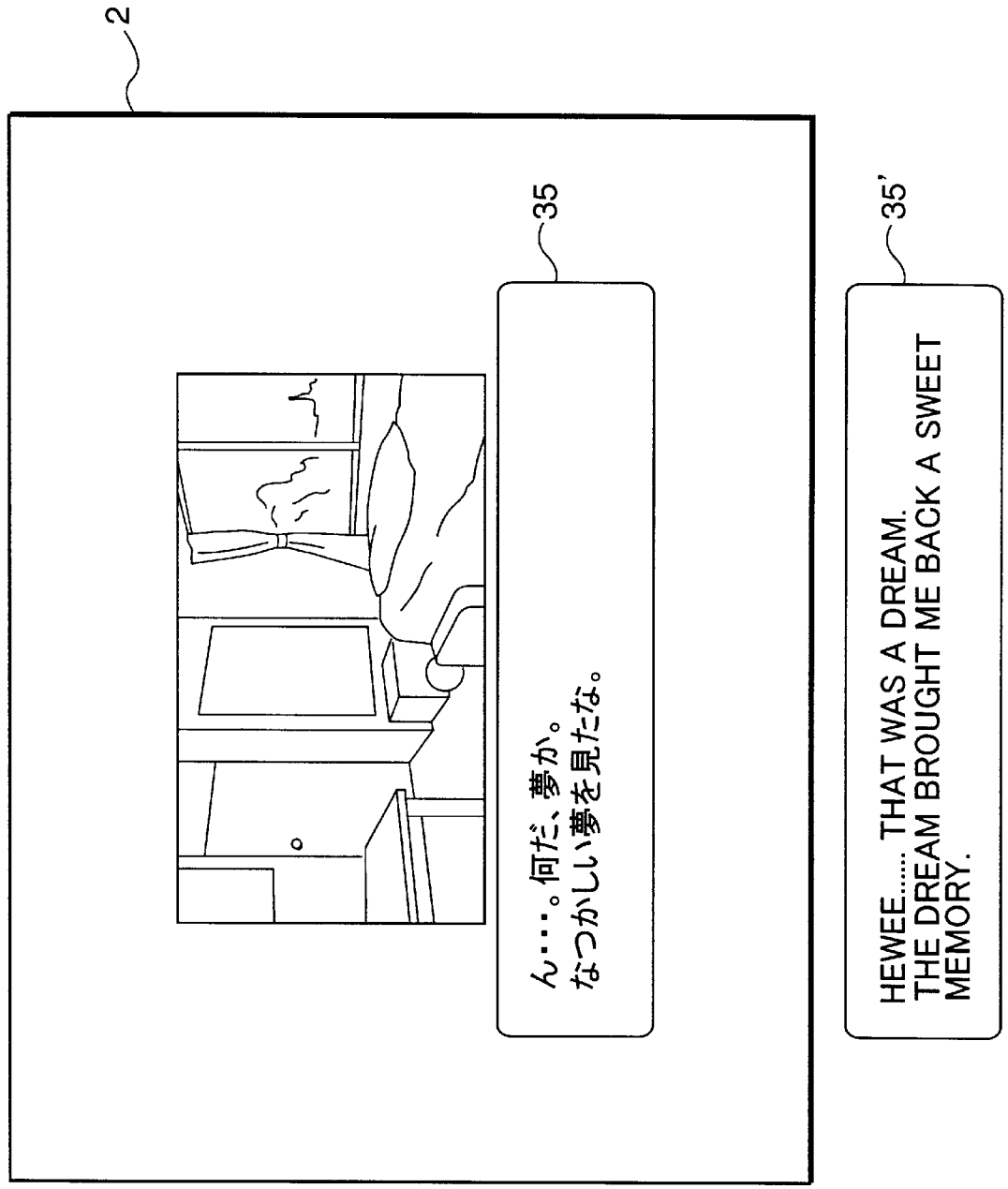

FIG. 3 is a block diagram showing functions of the CPU and a part of the devices shown in FIG. 1. It should be noted that the devices between the respective shown devices and the bus 7 are not shown in FIG. 3.

In FIG. 3, various soccer game modes enabling soccer games in conformity with the soccer rules and a game program including the player training mode are stored in the storage medium 5. This game program includes: (1) images of the main character, manager character as a leader of the main character, his teammate characters and friend characters; (2) sentences expressing contents of speeches such as lines of the human characters and imitation sounds relating to the contents of speeches (sentence storage means); and (3) the shape and display position of the game content display frame 35 (see FIG. 2).

In FIG. 3, various data including the ability values of the main character, and display positions (described later) of the respective characters forming sentences expressing the contents of speeches of the human characters and imitation sounds are stored in the non-display area of the RAM 8.

The CPU 6 is, as shown in FIG. 3, provided as function blocks with the game progress control means 61, a date renewing means 62, a judging means 63, a frame display control means 64, a sentence display control means 65, a vibration control means 66, a display mode changing means 67, a link control means 68 and a timer function (timer means).

The game progress control means 61 has a function of progressing the game by executing a game content selected by the controller 16 from "Training", "Rest", "Play", "Speak". The game contents which come up by the week include regular events which always occur upon reaching a certain point of time if specified factors are satisfied, and random events which randomly occur from a plurality of factors prepared in advance according to the selected game content. The regular and random events are executed by the game progress control means 61, respectively. Further, a display of the sentence(s) corresponding to the game content is instructed to the sentence display control means 65.

The date renewing means 62 functions as a time renewing means for advancing time in the game. Every time the menu relating to the game content is operated by the controller 16 to progress the game, time is advanced by one week from the $1^{st}$ week, April of the $1^{st}$ year till the $1^{st}$ week, September of the $3^{rd}$ year.

The judging means 63 operates in the $1^{st}$ week, September of the $3^{rd}$ year to judge whether the main character can be promoted from the youth team to the first team of the J-league. This judgment is made based on specific promotion conditions such as whether or not the main character possesses ability values necessary for the set position. If the promotion conditions are satisfied, the main character is promoted to the first team by judging a successful growth. Unless otherwise, the judging means 63 judges a "growth failure" and causes a "game over" processing to be performed.

The frame display control means 64 has a function of displaying the game content display frame 35 (see FIG. 2) in a specified position of the monitor 2. The game content display frame 35 is displayed in different colors depending upon the gender of the human character corresponding to the content of speech, and is set in the specified position which differs depending upon the display position of this human character on the screen.

The sentence display control means 65 has following two functions (1) and (2).

(1) Function of displaying the sentences expressing the contents of speeches of the human characters and imitating sounds relating to the contents of speeches in the specified position within the game content display frame 35 (see FIG. 2) on the monitor 2 upon receiving an instruction from the game progress control means 61. At the leading end of the character data forming the sentence expressing the game content is set a character enlarging flag for discriminating whether or not an enlargement display is to be performed. If this character enlarging flag is reset, the character data are displayed in a usual manner by the sentence display control means 65. If the character enlarging flag is set, the enlargement display is performed by the display mode changing means 67.

The sentence display control means 65 displays sentences in 1 to 3 lines such that characters are added one by one every frame (specified interval of, e.g. 1/60 sec.). Upon completion of counting of a specified period following a character display completion timing of one line, the character display for the next line is started. The display positions (coordinates) of the respective characters are read from the storage medium 5 and stored in the RAM 8.

(2) Function as a forwarding control means for forcibly completing the above counting when the A-button (forward button) 16b is operated. The character display for the next line can be immediately started by forcibly completing the counting of the specified period following the character display completion timing of one line.

The vibration control means 66 has a function of vibrating the vibration pack 16p by sending a drive signal thereto when the vibration pack 16p is connected with the connector 16m of the controller 16. Accordingly, vibration is transmitted to the game player holding the controller 16, expressing a shock to the human character corresponding to the game content.

The display mode changing means 67 has following functions (1) to (3).

(1) Enlargement display function of reducing the sizes of the respective characters to the initial size after successively enlarging them when a specific character display is executed for the sentence expressing the game content to be displayed in the game content display frame 35. A shock and the like to the human character corresponding to the game content can be expressed by this character enlargement display function.

(2) Function of displaying the sentence such that characters are added one by one at every interval larger than one frame (e.g. at every interval of 2 frames) in the case of the character enlargement display, and function of temporarily pausing the function of the sentence display control means 64 as the forwarding control means. Specifically, the characters are displayed one by one at a speed lower than usual during the character enlargement display, and the character display for the next line is not started until the counting of the specified period following the character display completion timing for one line is completed even if the A-button 16b is operated during the character enlargement display. This prevents the effect of expressing the shock to the human character from being reduced.

(3) Function as a frame display mode changing means for transversely reciprocating the display position of the game content display frame 35 and changing the shape of the game content display frame 35. With this function, a shock of the main character when he collides with something or is surprised during the game can be expressed.

The link control means 68 has a function of linking a change (character enlargement display and reciprocation and change of the shape of the game content display frame 35) of the display mode by the display mode changing means 67 and the driving of the vibration pack 16p. In other words, the display mode is changed and the vibration pack 16p is driven when the content of speech or imitation sounds expressing a specific game content is displayed.

Next, the respective functions are specifically described for the following cases (1) to (7) with reference to FIGS. 4 to 32 showing scenes of the game.

Note that hereinafter each of FIGS. 4–32 shows a screen of a game containing a game content display frame 35. However, FIGS. 5–8, 10–13, and 15–32 contain onomatopoeia (imitative sounds such as "Hummm" or "Hew??"), thus it may not be possible to find a one to one correspondence between Japanese onomatopoeic word and English onomatopoeic word. Generally speaking we Japanese have more onomatopoeic words than English. Accordingly, we expressed Japanese conversation and onomatopoeic word in Japanese words and characters in the display frame 35 and corresponding English conversation and onomatopoeic word in English words and characters in a frame 35' which is provided underneath the television screen 2. It should also be noted that, the accuracy of the English version onomatopoeic word with respect to Japanese onomatopoeic word in Japanese should not be questioned. The main purpose for having the corresponding frame 35' is for non-Japanese speaking reader to understand what is most likely mentioned in the display frame 35 and how the arrangement of the Japanese characters and corresponding English characters look like in the display frames 35, 35'.

Figure 5:
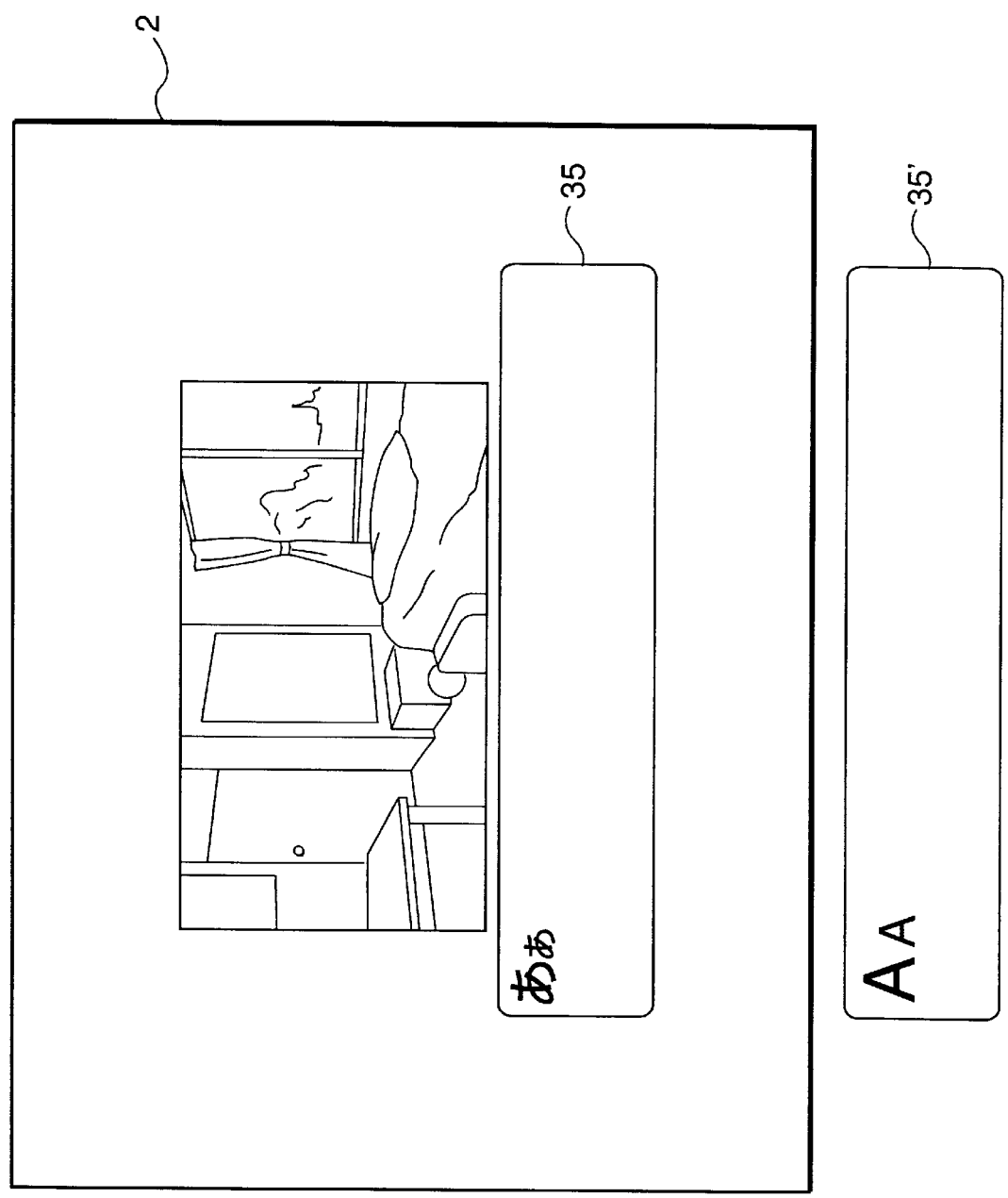
Figure 6:
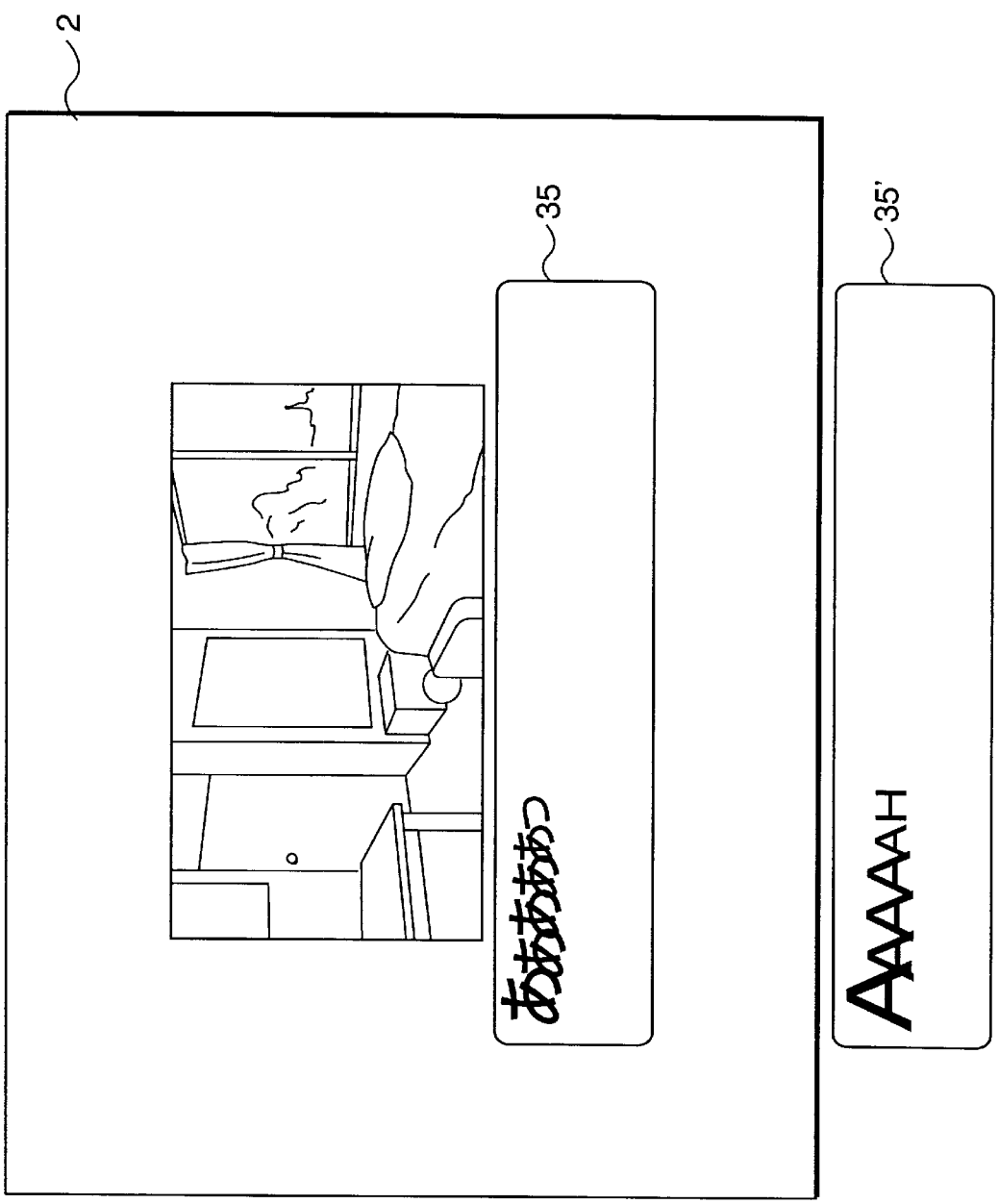
Figure 7:
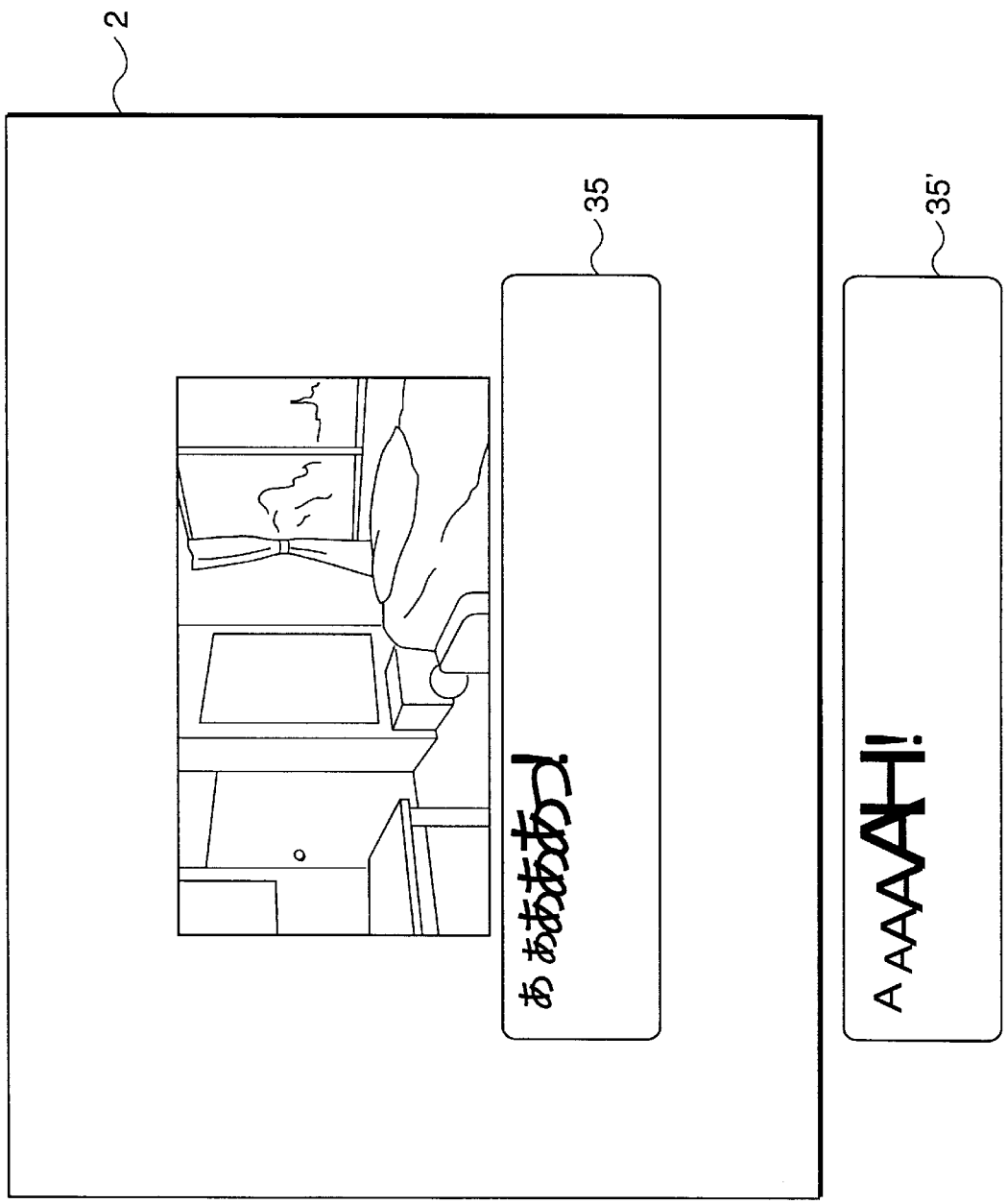
Figure 8:
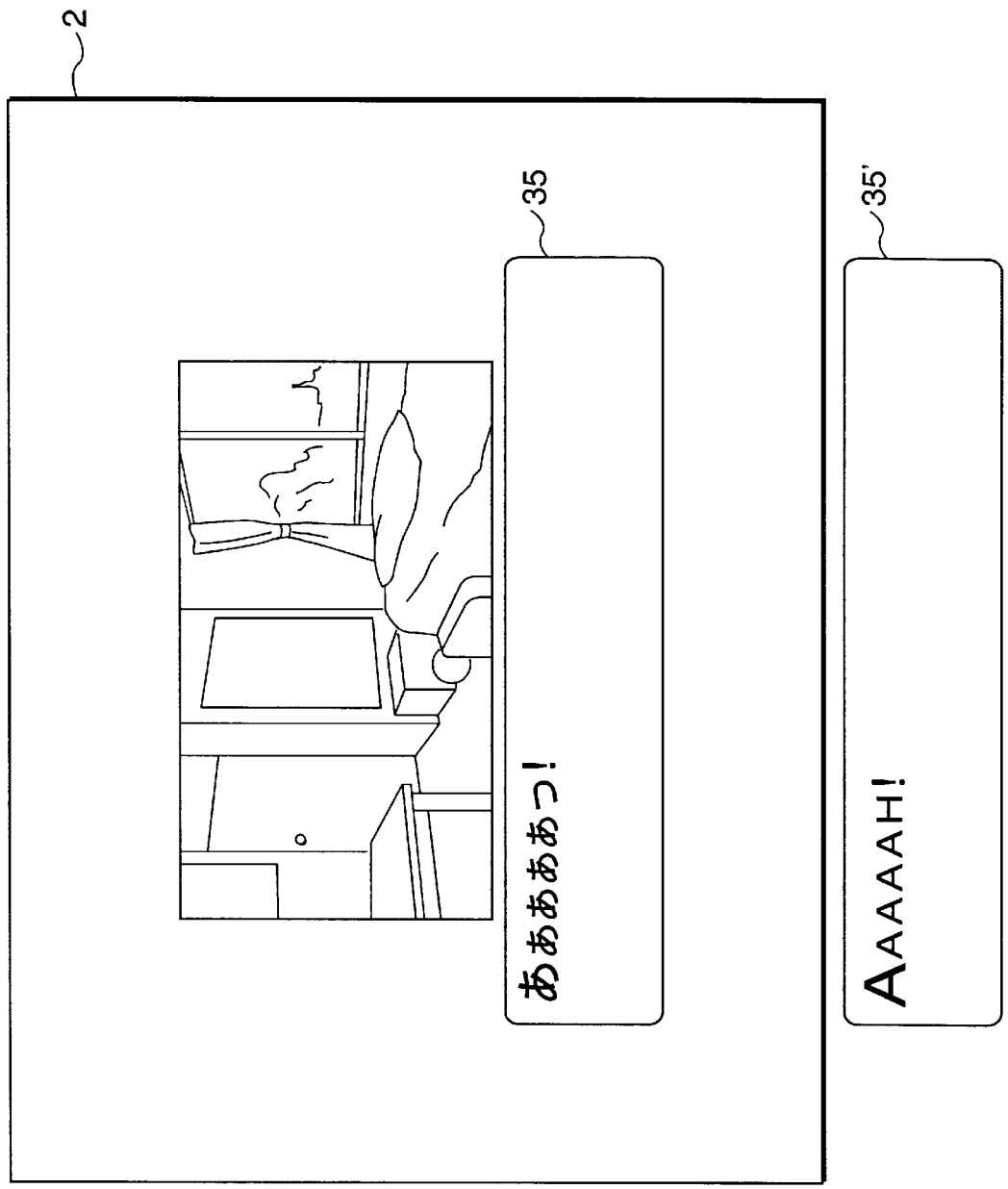
Figure 9:
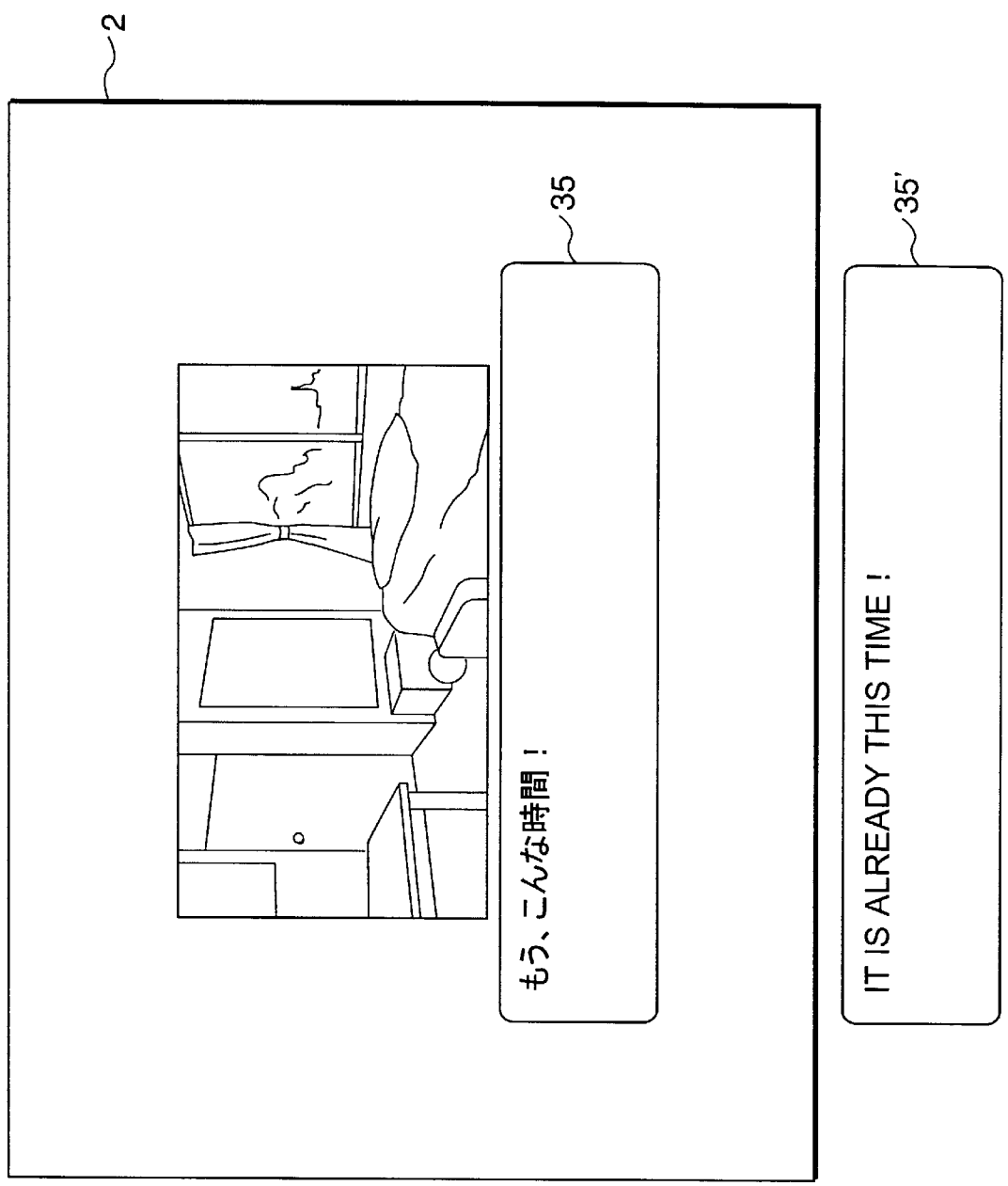

(1) FIGS. 4 to 9 show scenes showing the bedroom of the main character. In these scenes, the characters are enlargedly displayed as shown in FIGS. 5 to 8. Particularly as shown in FIGS. 5 to 7, the character whose size becomes at maximum is successively moved from the leading end and is displayed in a wavy manner. As is clear from a comparison of FIG. 5 with the other FIGURES, the game content display frame 35 is slightly moved to the left and right. In FIGS. 5 to 8, the character enlargement is linked with the vibration of the vibration pack 16p. By the vibration of the vibration pack 16p and the character enlargement display, a shock the main character had in getting up later than planned is effectively expressed.

Figure 10:
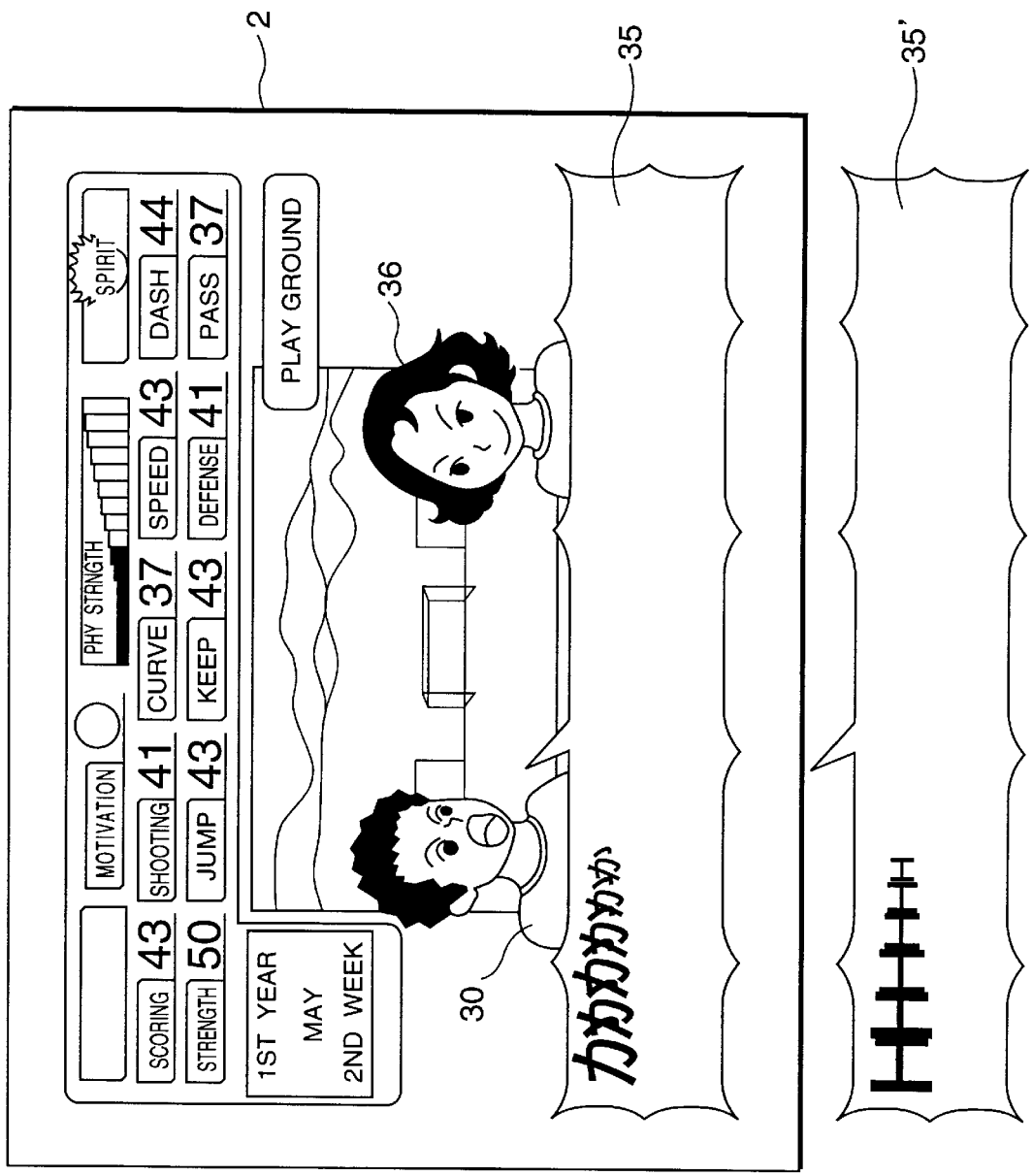
Figure 11:
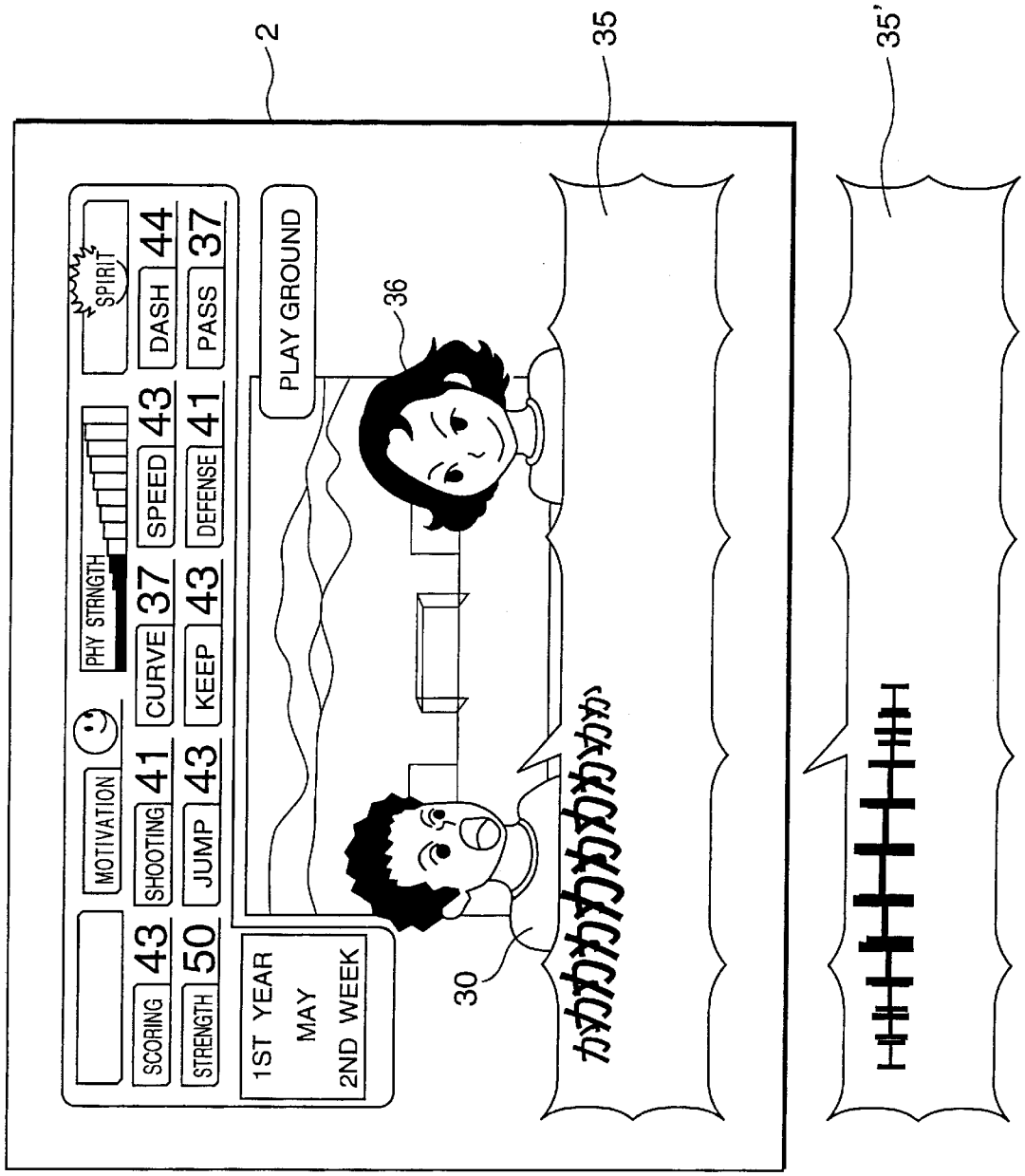
Figure 12:
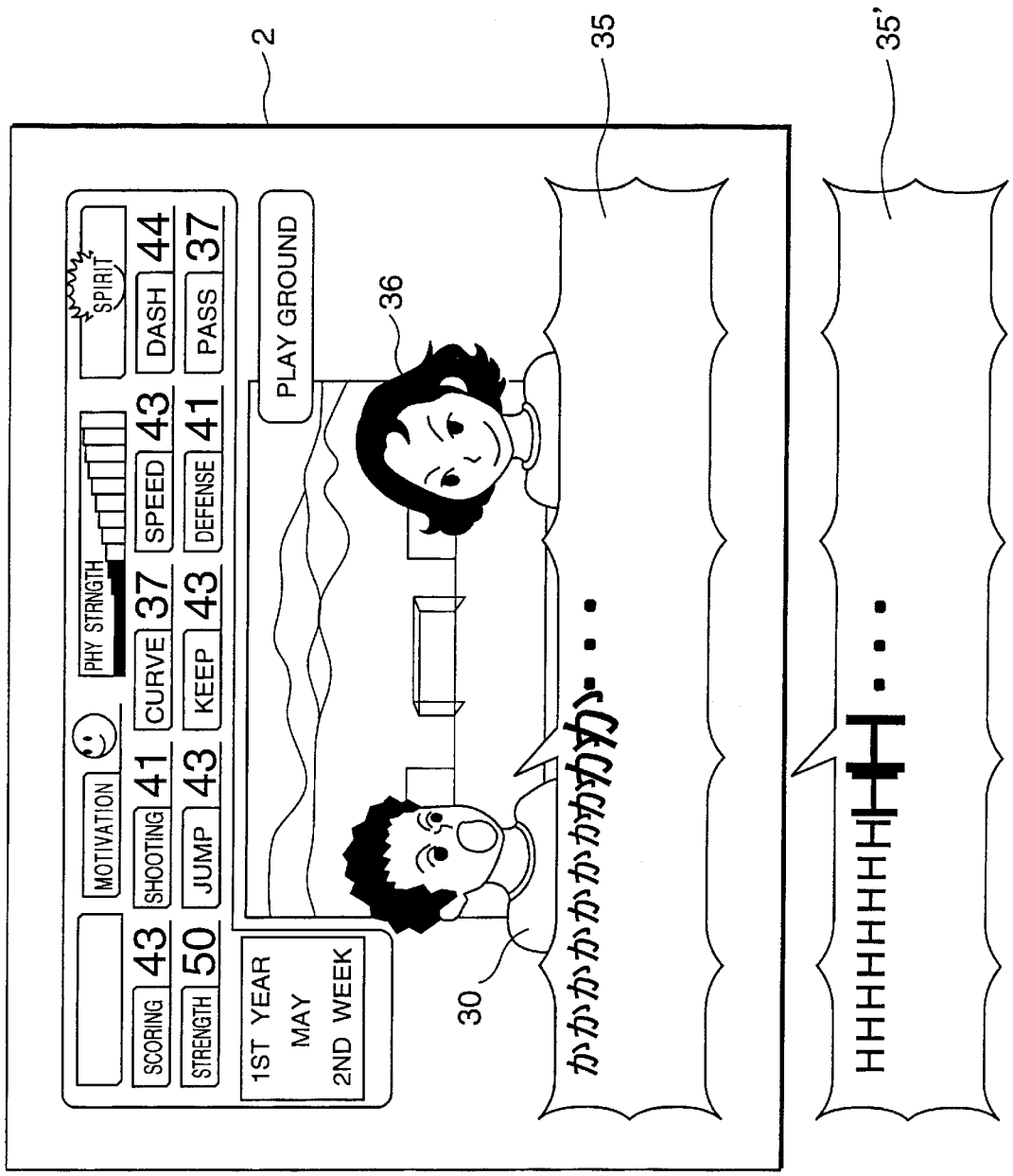
Figure 13:
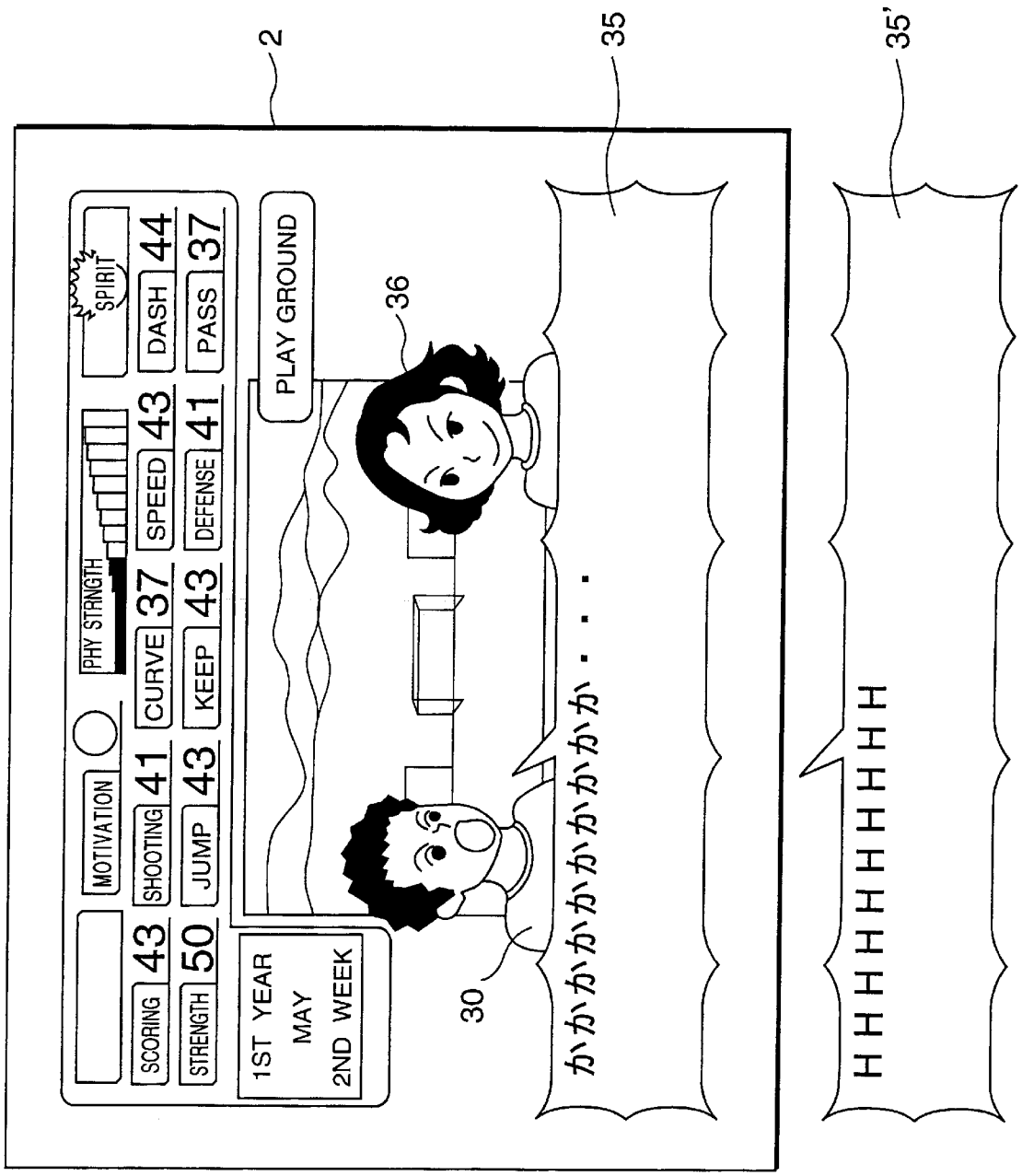
Figure 14:
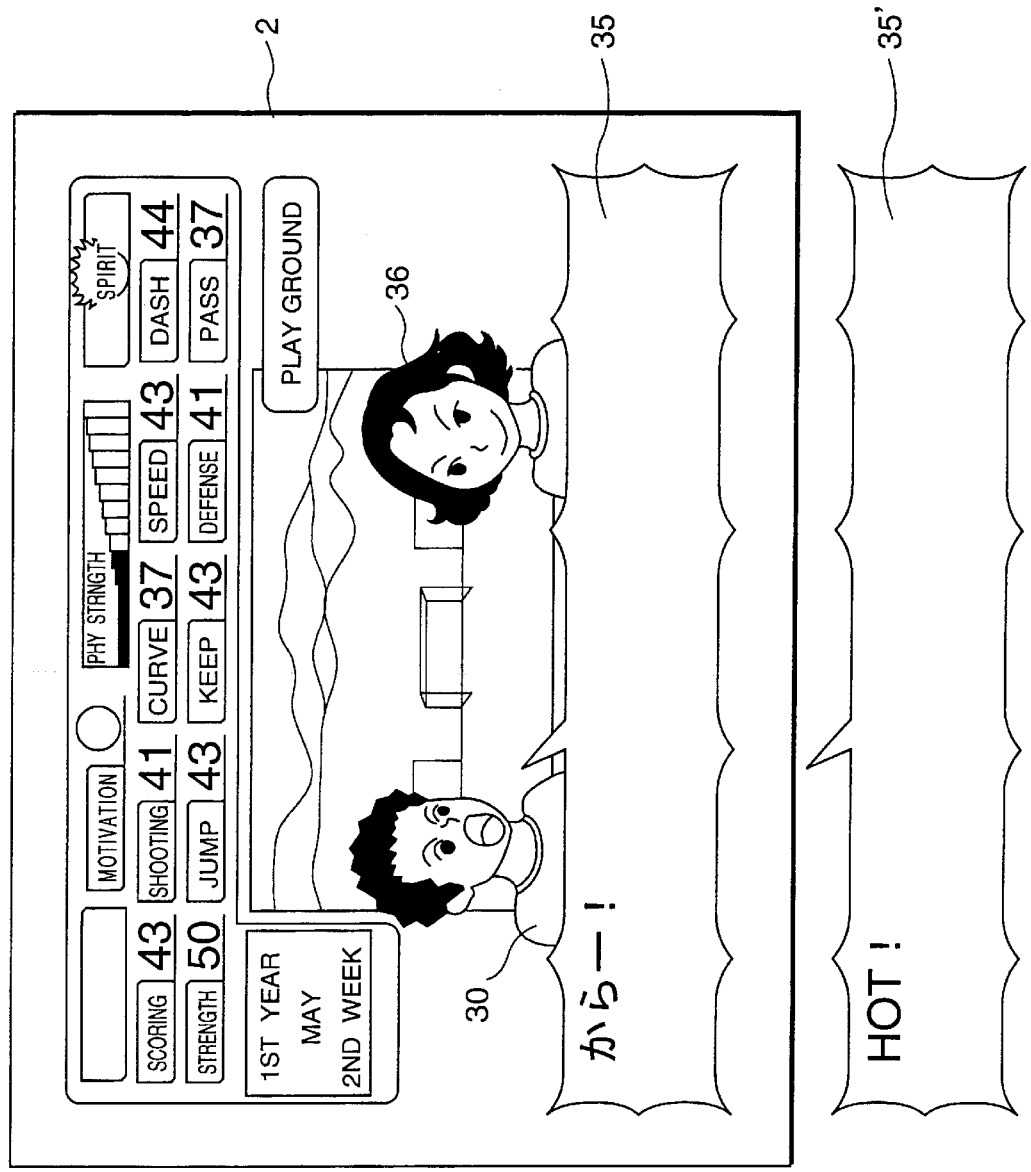

(2) FIGS. 10 to 14 are conversation scenes of the main character 30 and a friend character 36. In these scenes, characters are enlargedly displayed in such a manner that the character whose size becomes at maximum is successively moved from the leading end as shown in FIGS. 10 to 12. Further, the shape of the game content display frame 35 is changed. It should be noted that the vibration pack 16p is not vibrated during the character enlargement shown in FIGS. 10 to 14. A shock the main character 30 had in eating a hot stuff is expressed by the above.

Figure 15:
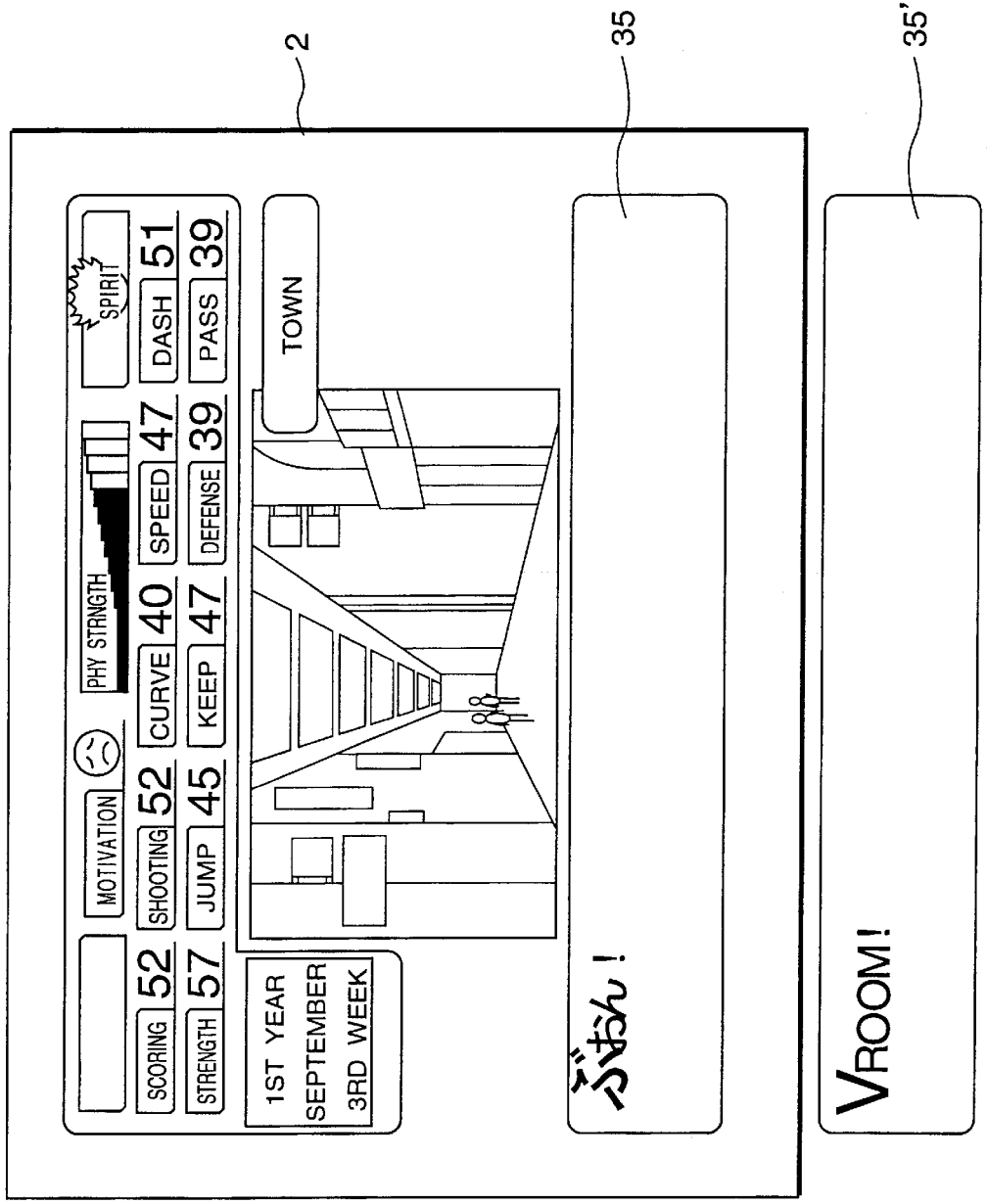
Figure 16:
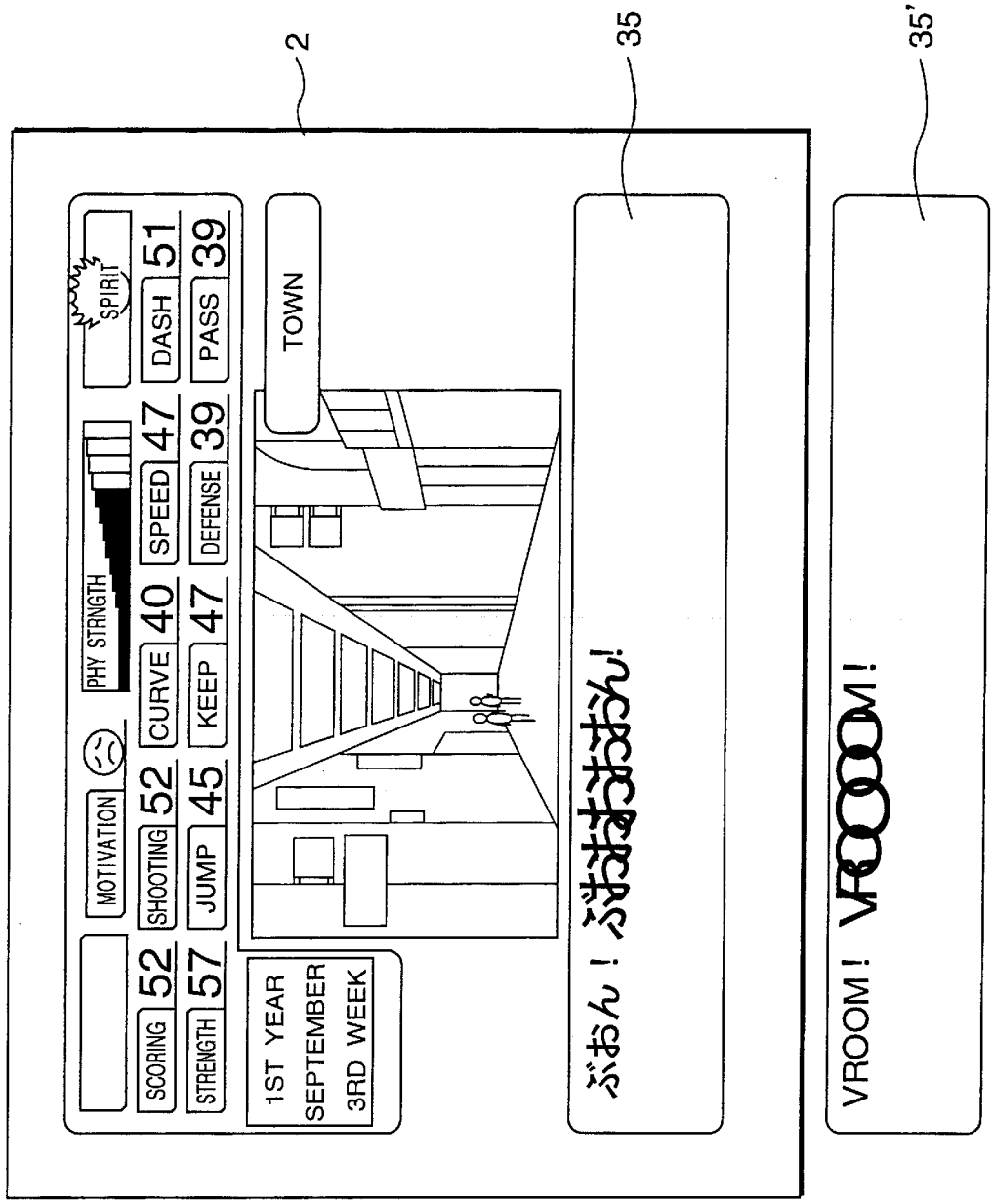
Figure 17:
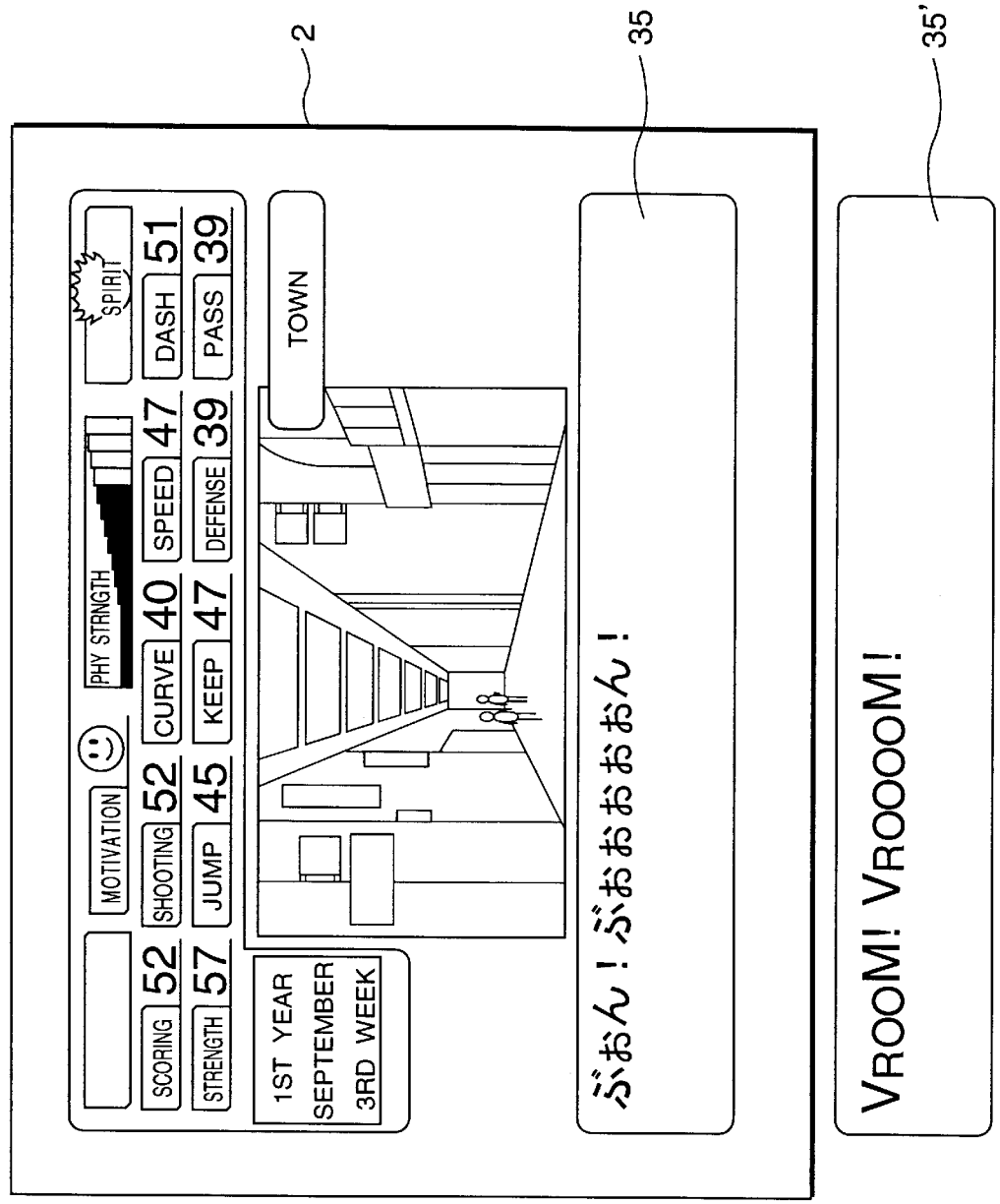
Figure 18:
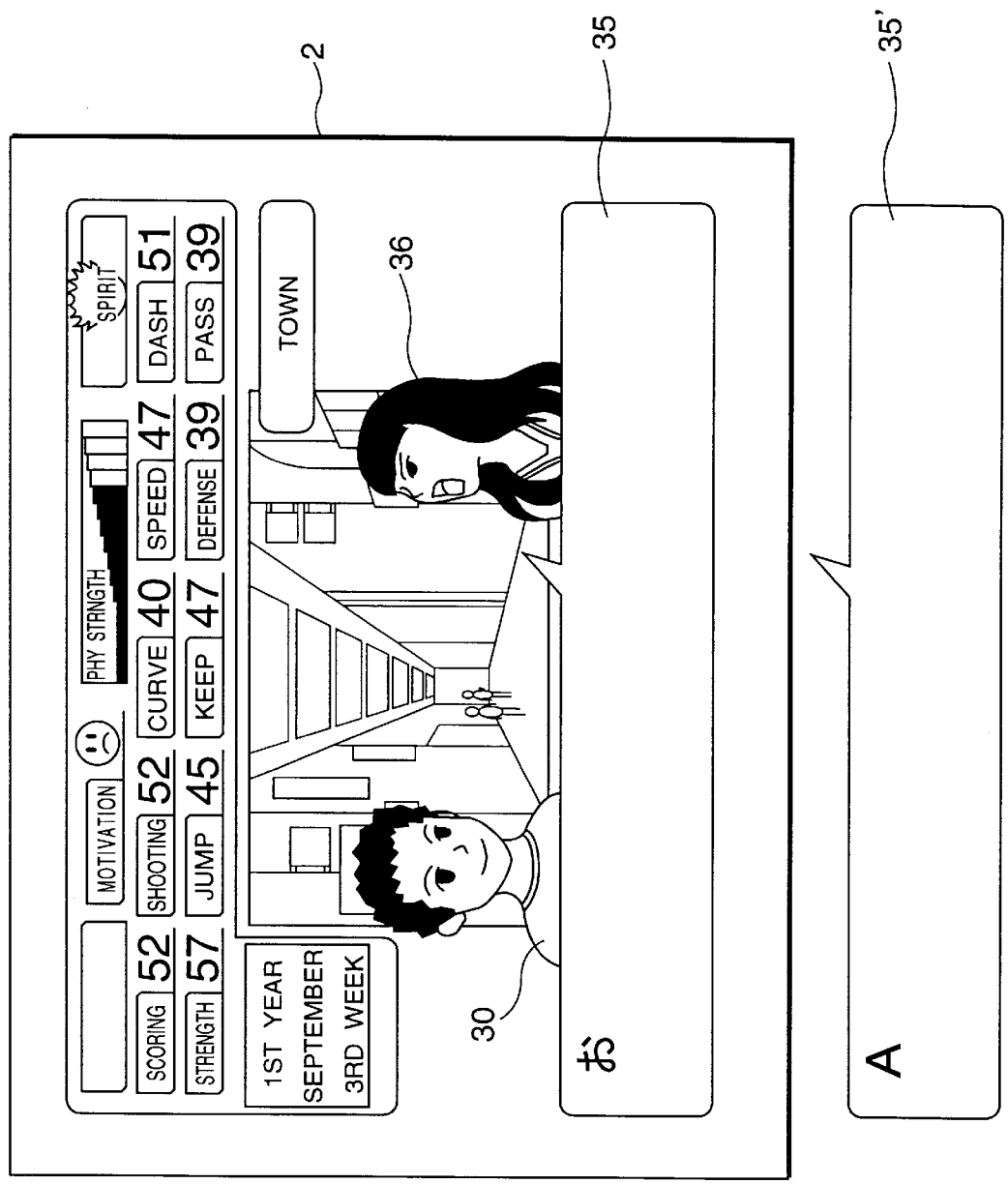

(3) FIGS. 15 to 17 show scenes on a street. In these scenes, characters are enlargedly displayed in such a manner that the character whose size becomes at maximum is successively moved from the leading end as shown in FIGS. 15 and 16. It should be noted that the vibration pack 16p is not vibrated during the character enlargement shown in FIGS. 15 to 17. Sound effects representing a motorbike which is not particularly displayed in the screen are given by enlargedly displaying imitating sounds of the motorbike in this way.

Figure 19:
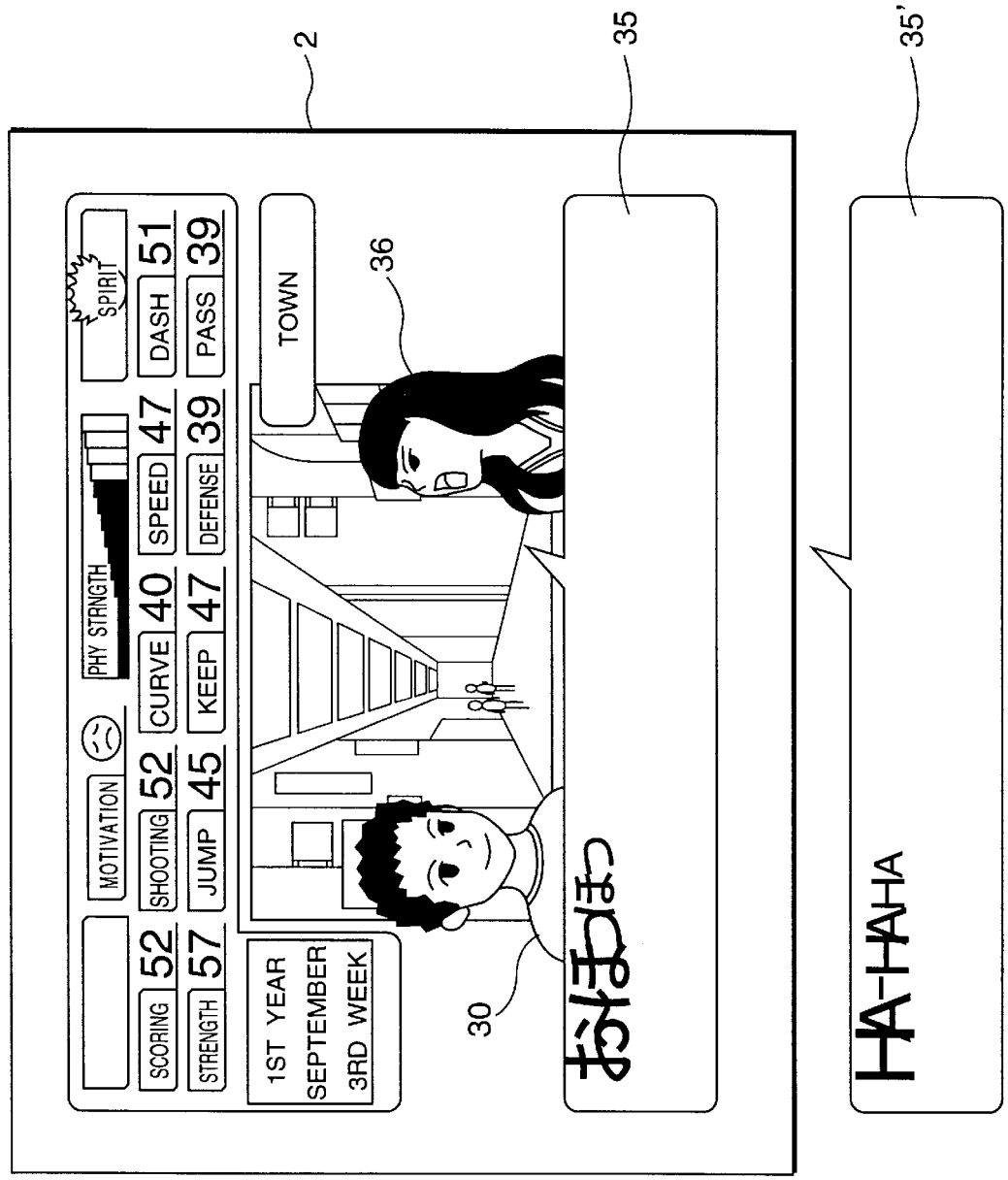
Figure 20:
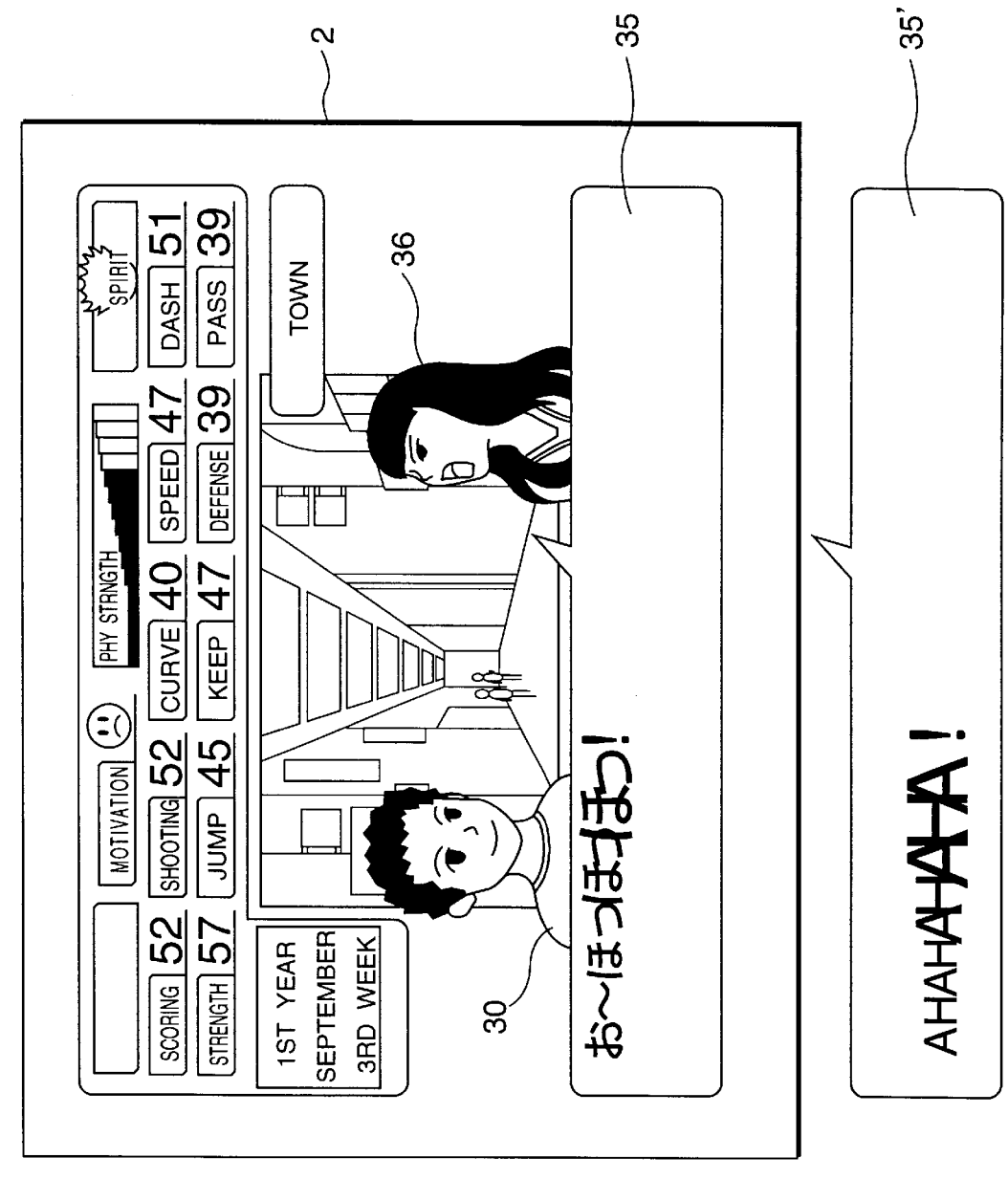
Figure 21:
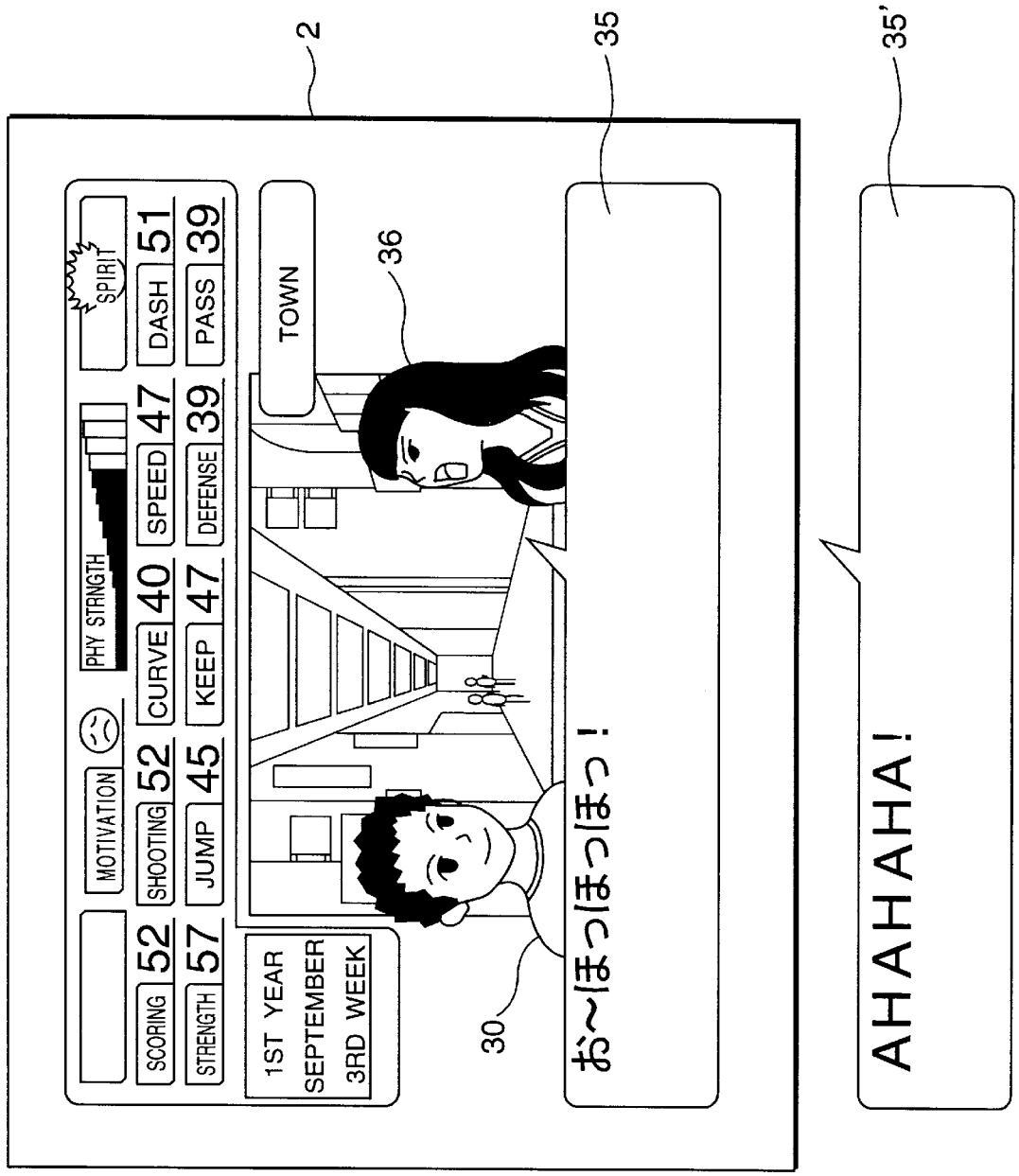
Figure 22:
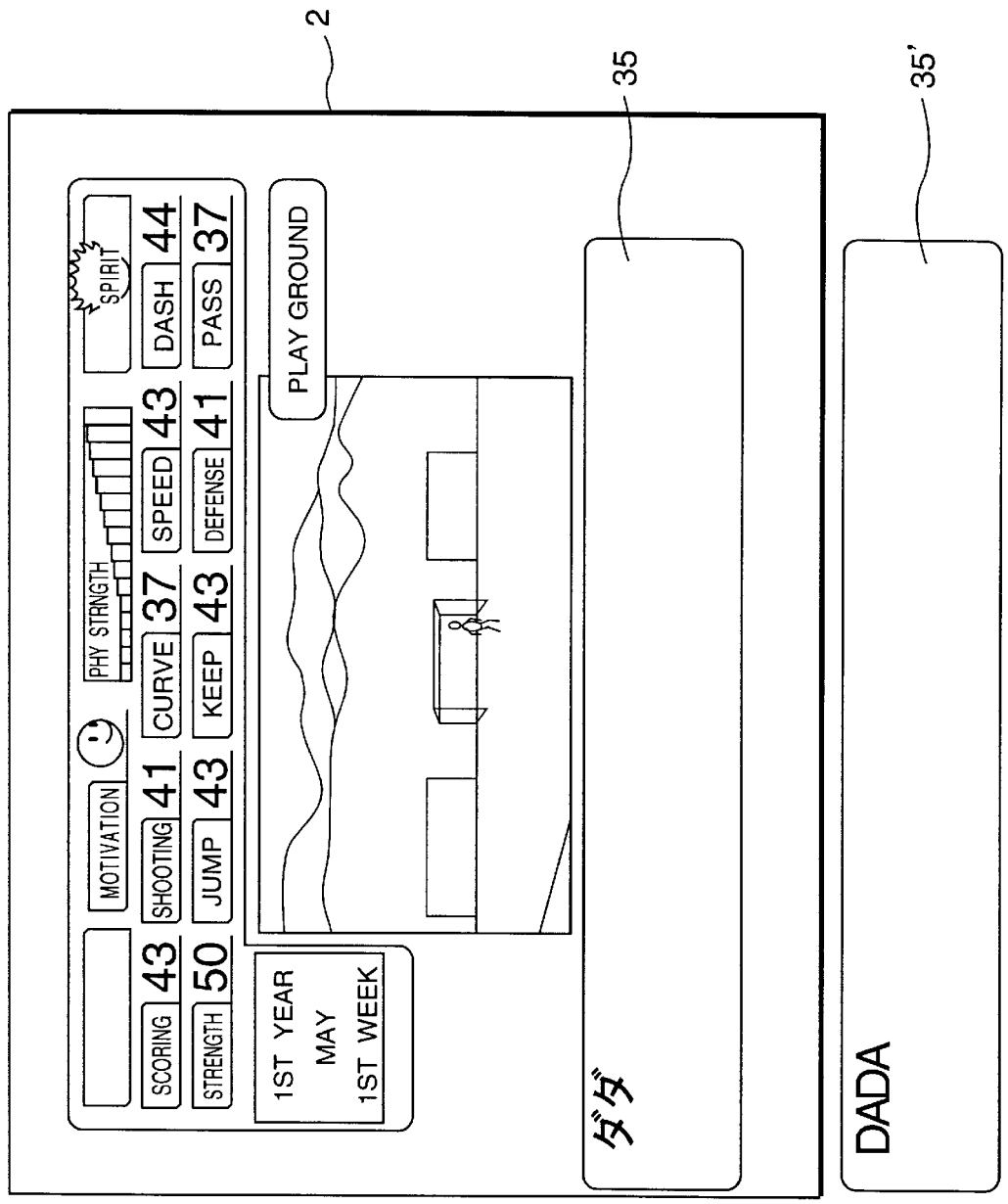
Figure 23:
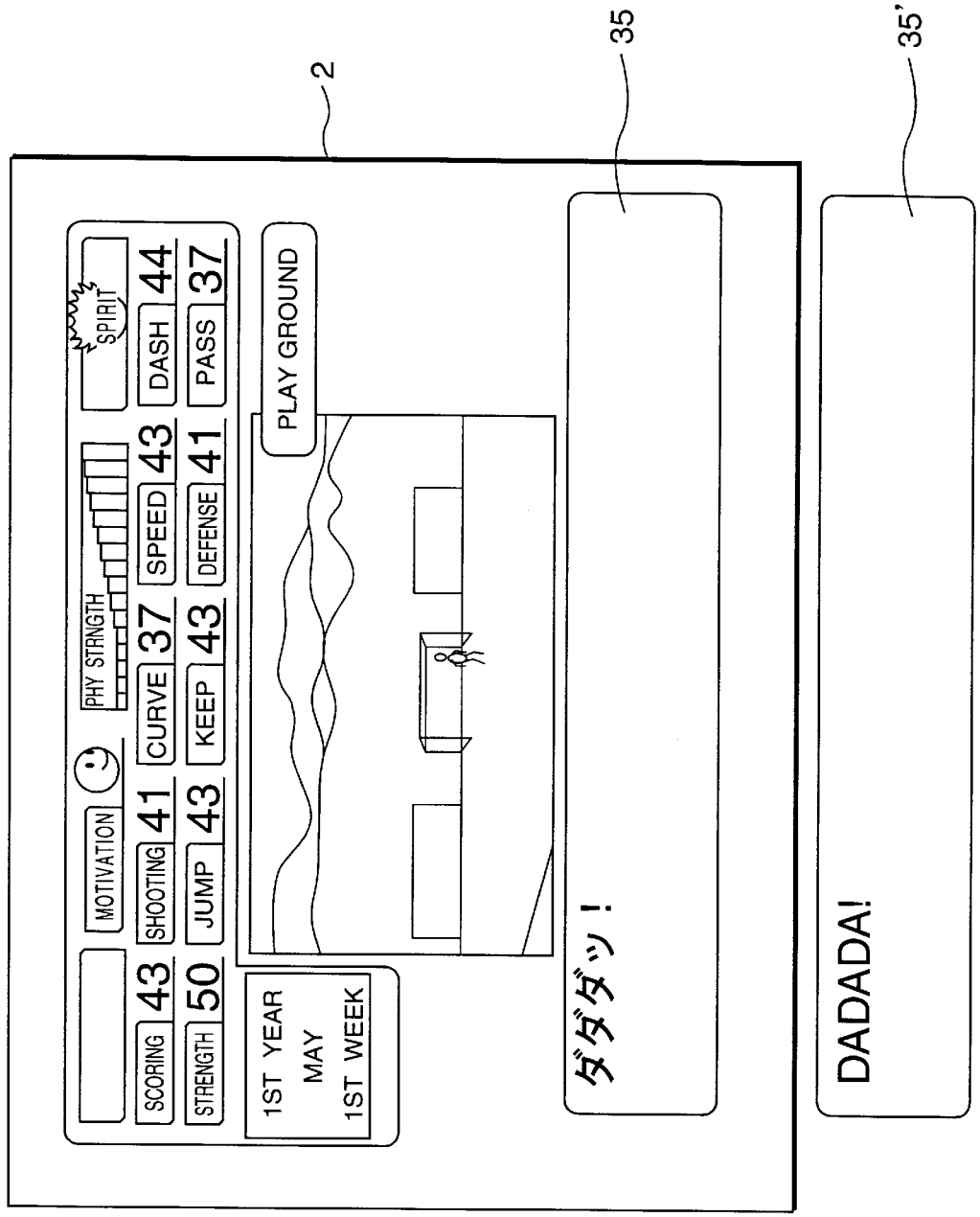
Figure 24:
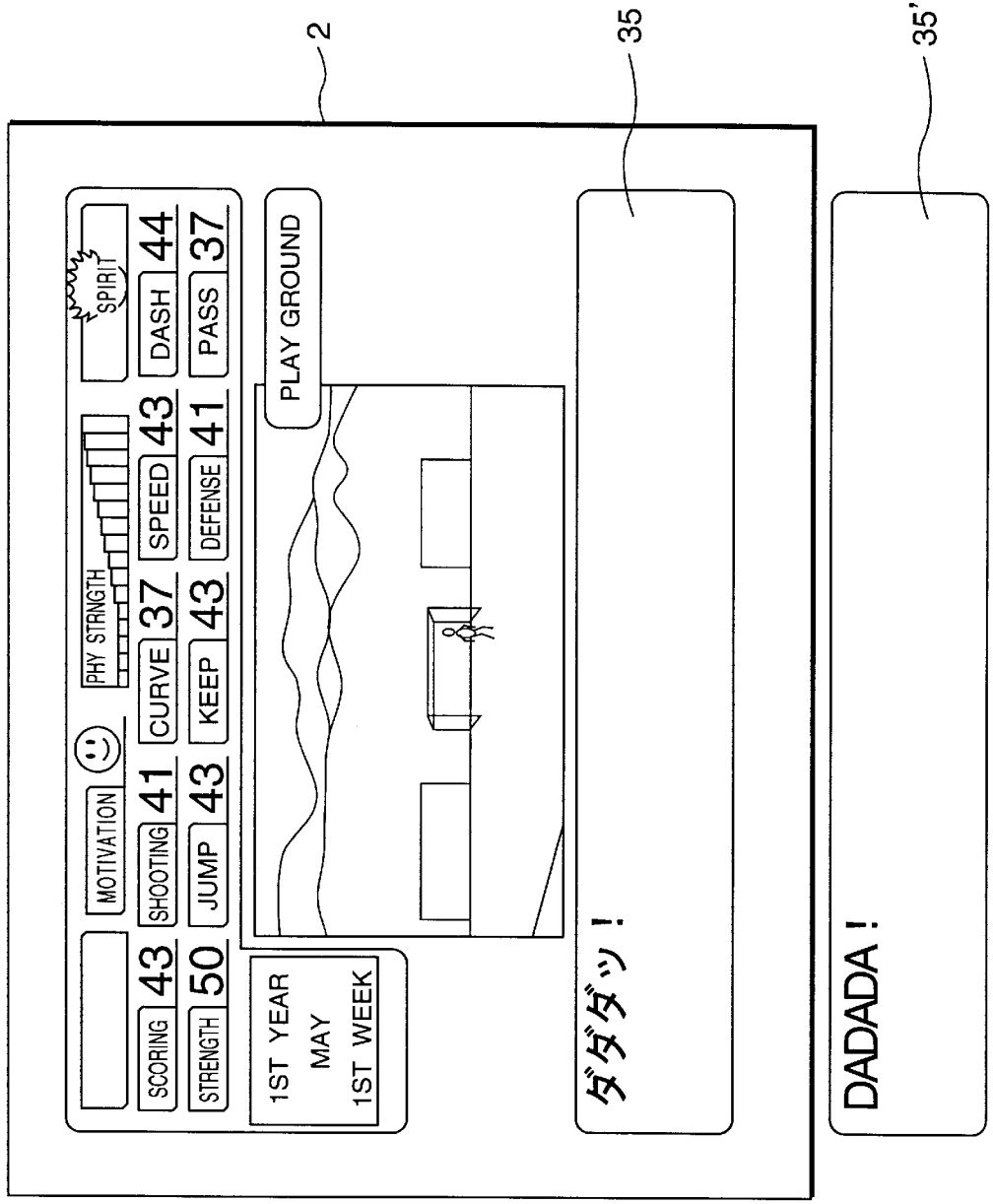
Figure 25:
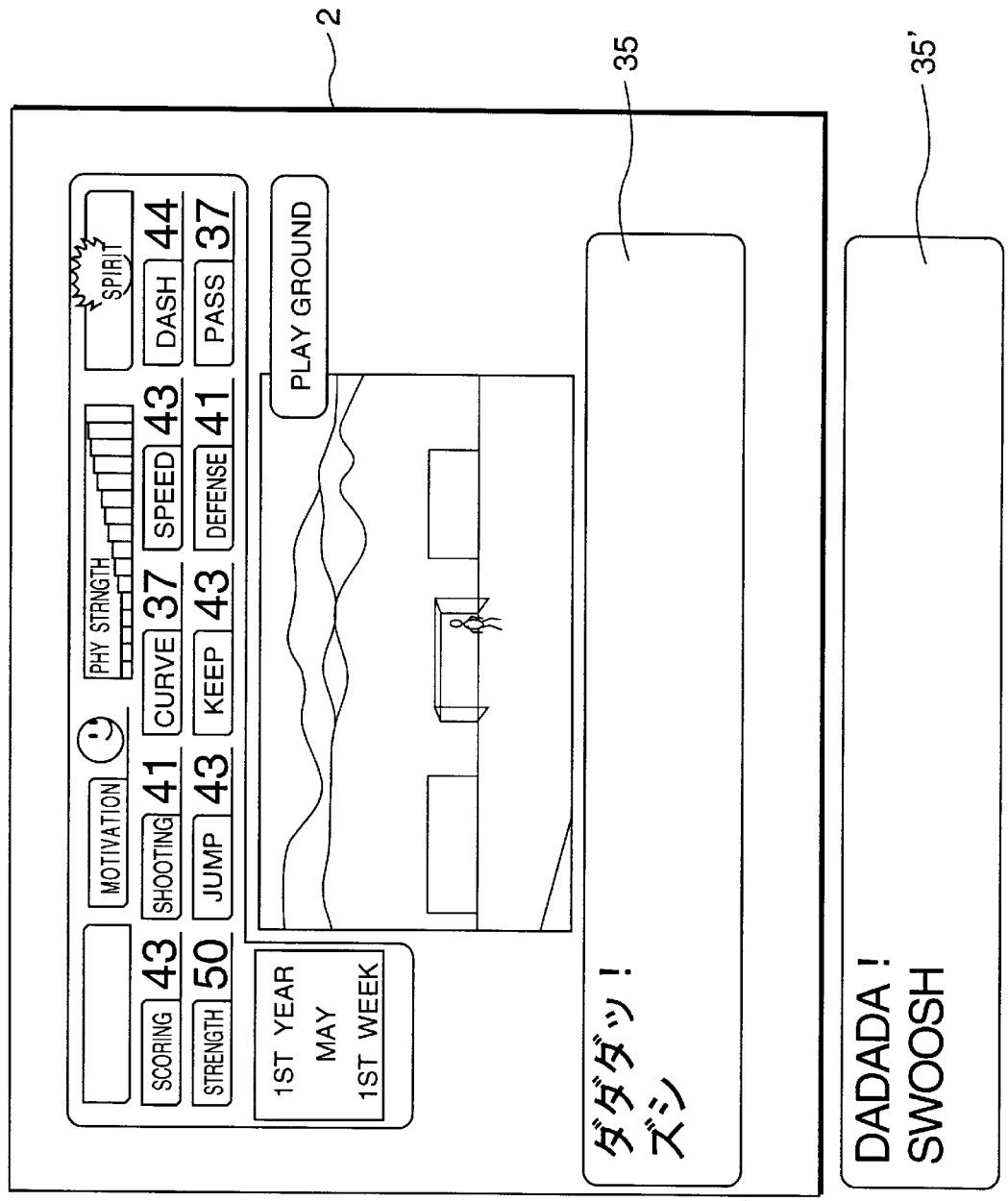
Figure 26:
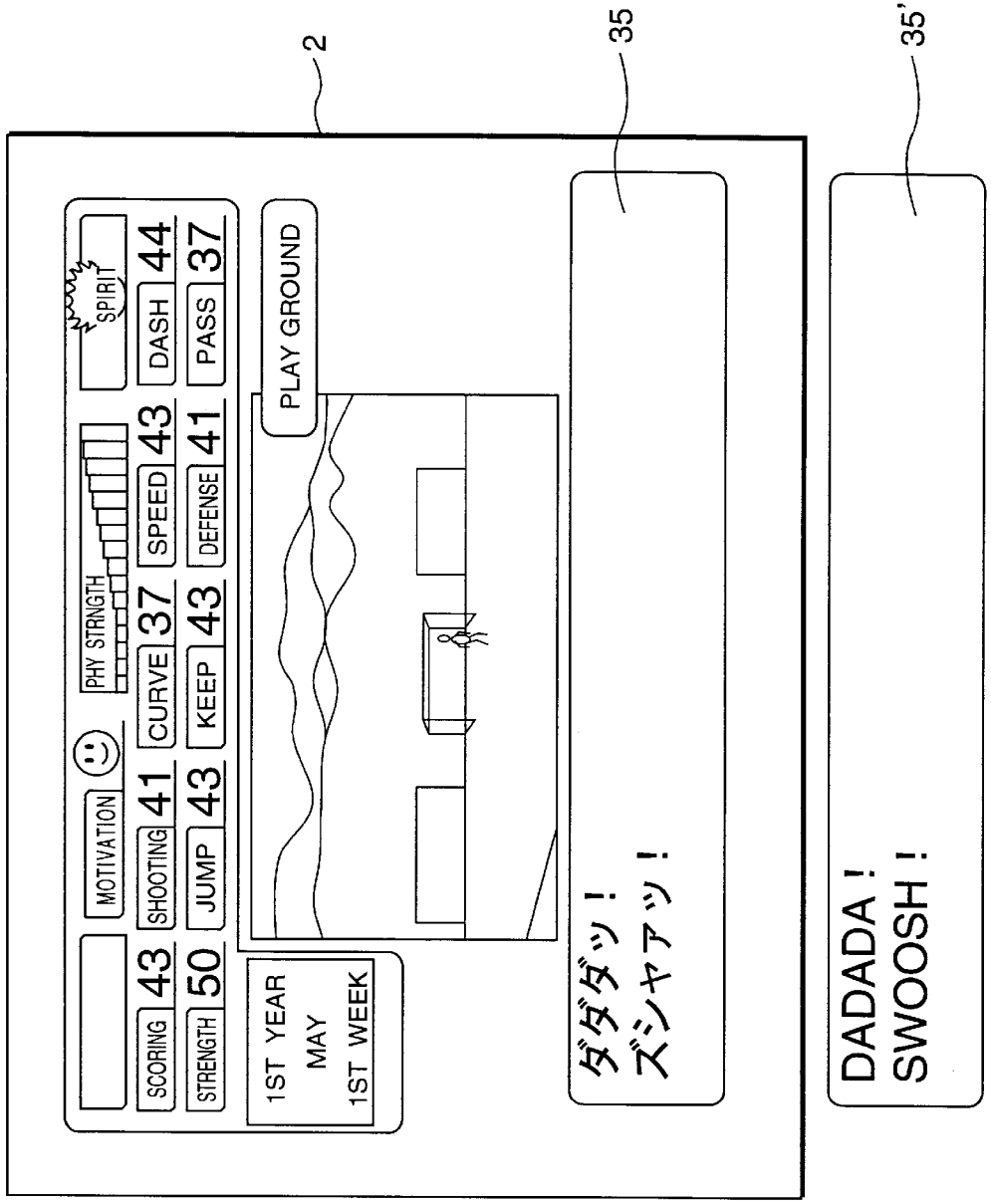
Figure 27:
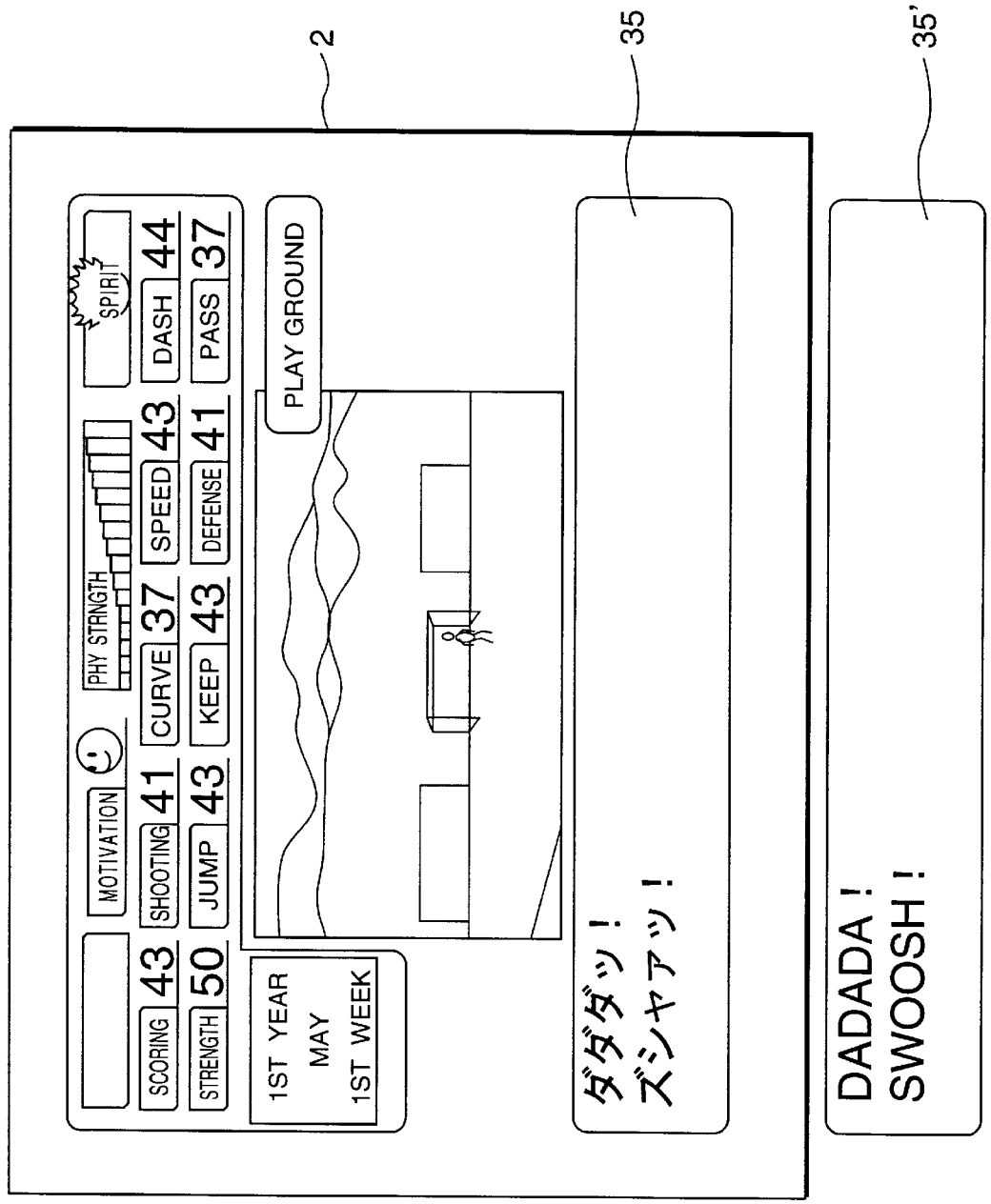

(4) FIGS. 18 to 21 are conversation scenes of the main character 30 and a friend character 36. In these scenes, characters are enlargedly displayed in such a manner that the character whose size becomes at maximum is successively moved from the leading end as shown in FIGS. 19 and 20. It should be noted that the vibration pack 16p is not vibrated during the character enlargement shown in FIGS. 18 to 21. Loud laugh of the friend character 36 of the main character 30 is expressed by the above.

(5) FIGS. 22 to 27 show training scenes of the main character. In these scenes, the display position of the game content display frame 35 is reciprocated to the left and right. Further, the movement of the display position and the vibration of the vibration pack 16p are linked. Training events of the main character who is not particularly displayed on the screen are effectively expressed by vibrating the vibration pack 16 and laterally reciprocating the display position of the game content display frame 35 when imitating sounds representing a dash and a sliding are displayed.

Figure 28:
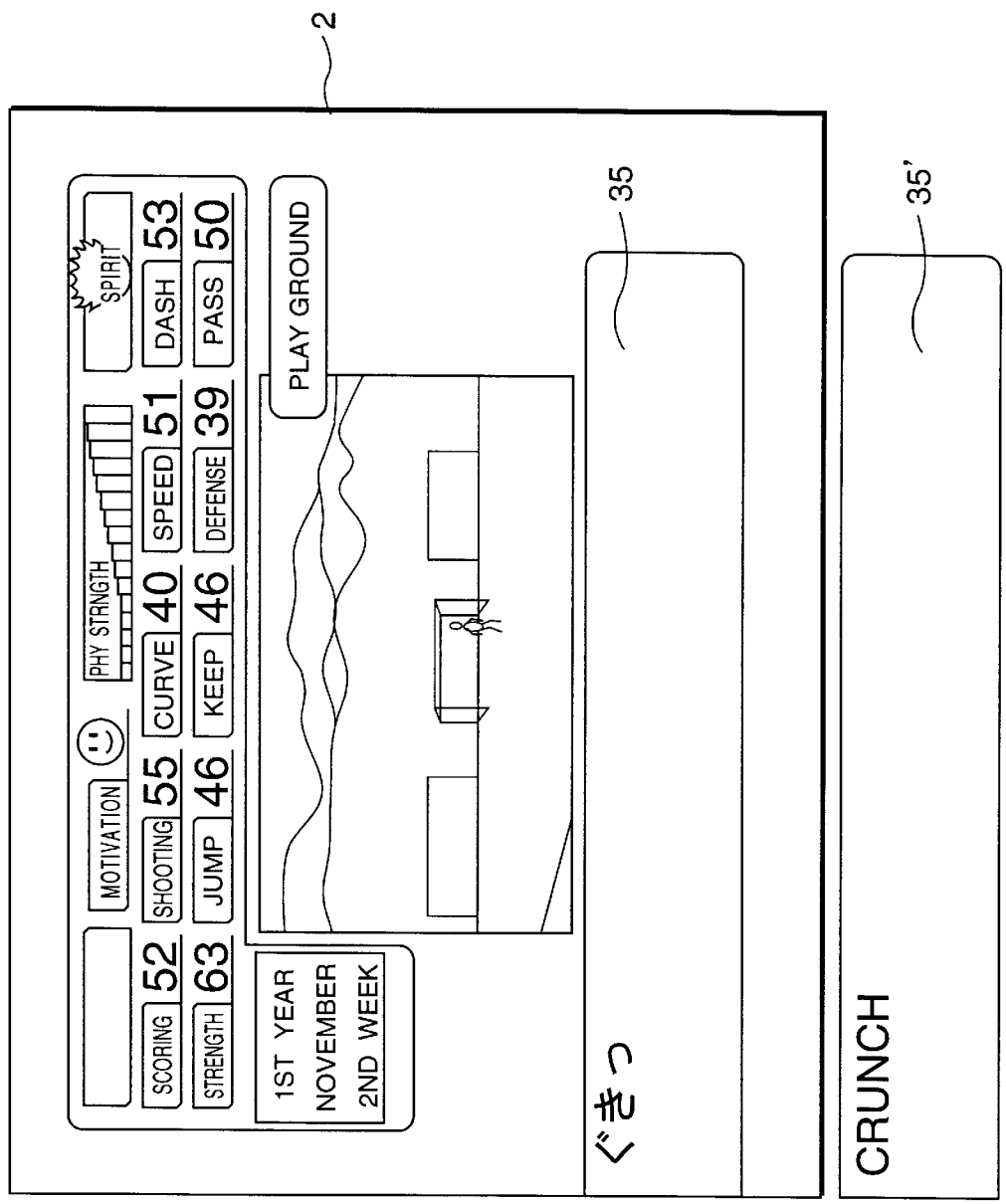
Figure 29:
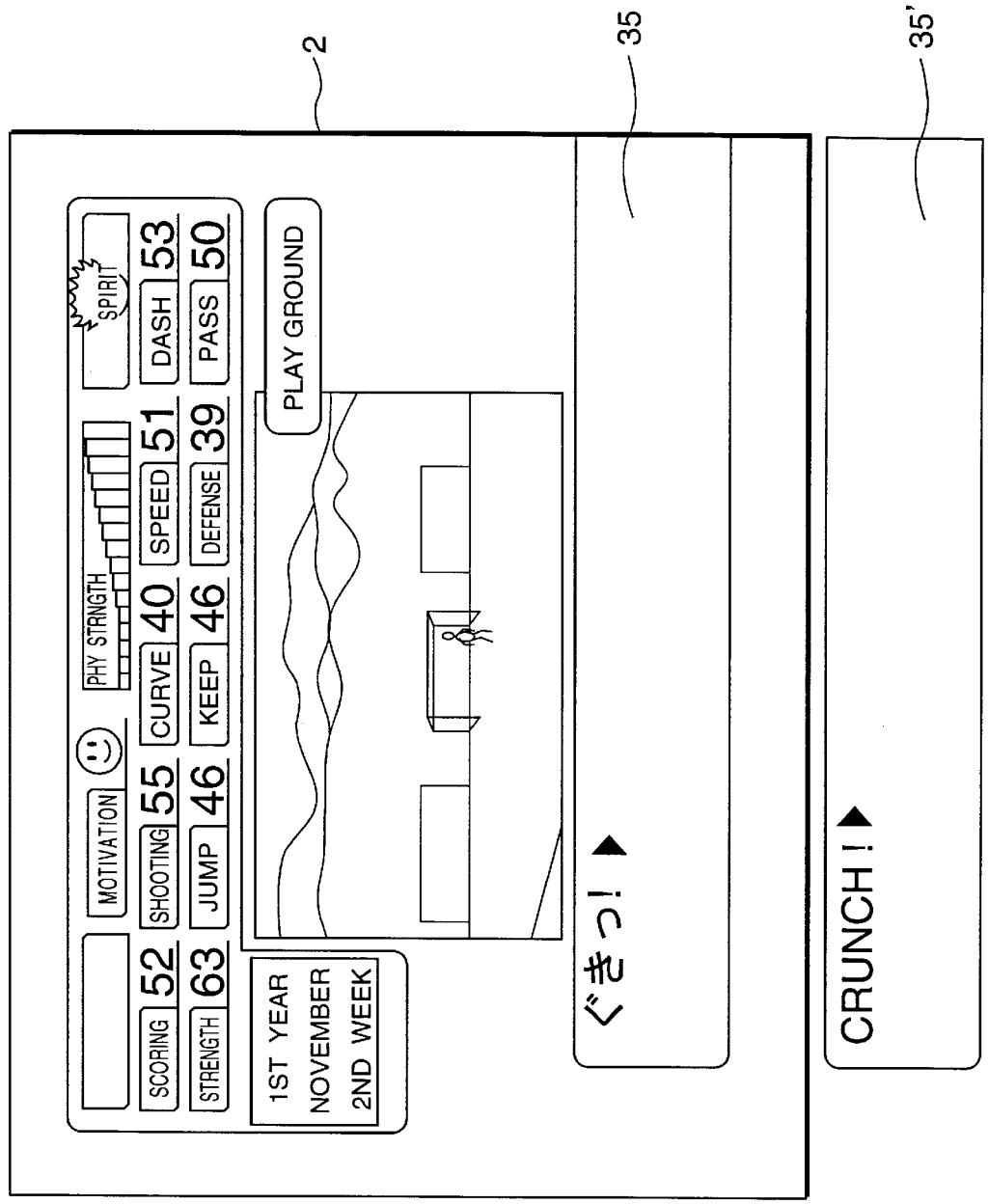
Figure 30:
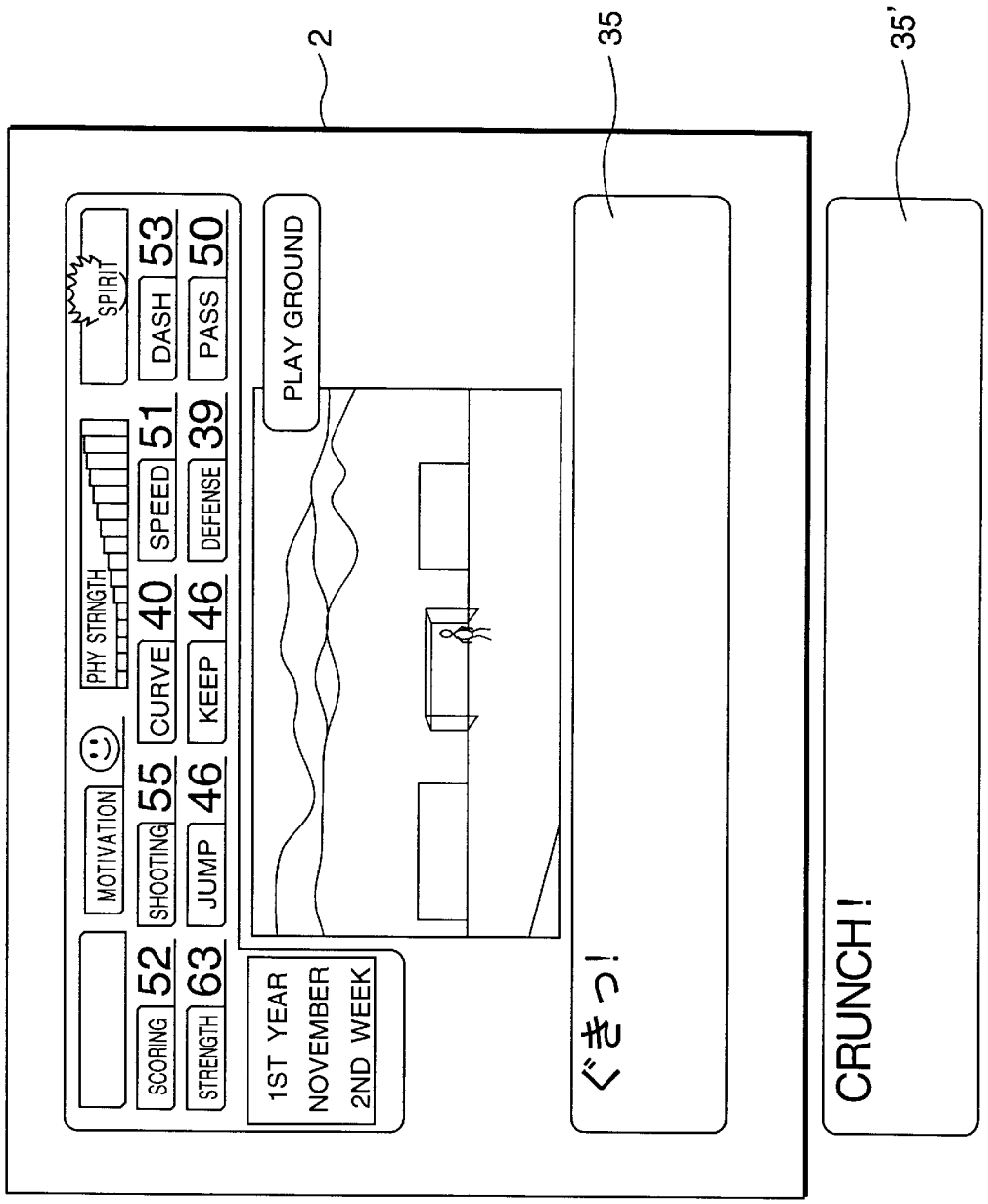

(6) FIGS. 28 to 30 show training scenes of the main character. In these scenes, the display position of the game content display frame 35 is reciprocated to the left and right. Further, the movement of the display position and the vibration of the vibration pack 16p are linked. An injury event of the main character who is not particularly displayed on the screen is effectively expressed by vibrating the vibration pack 16 and laterally reciprocating the display position of the game content display frame 35 when an imitating sound representing an injury such as a sprain is displayed.

Figure 31:
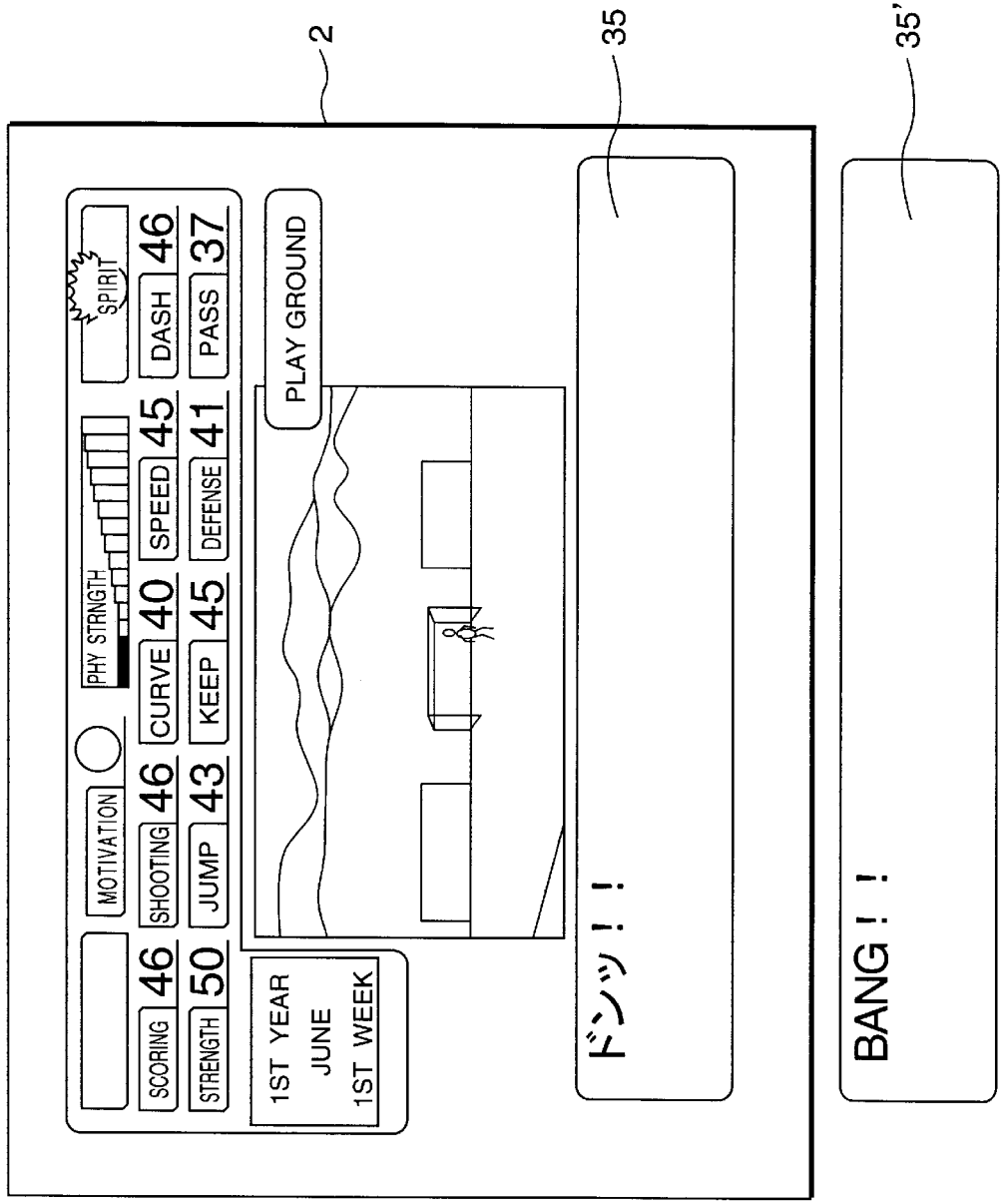
Figure 32:
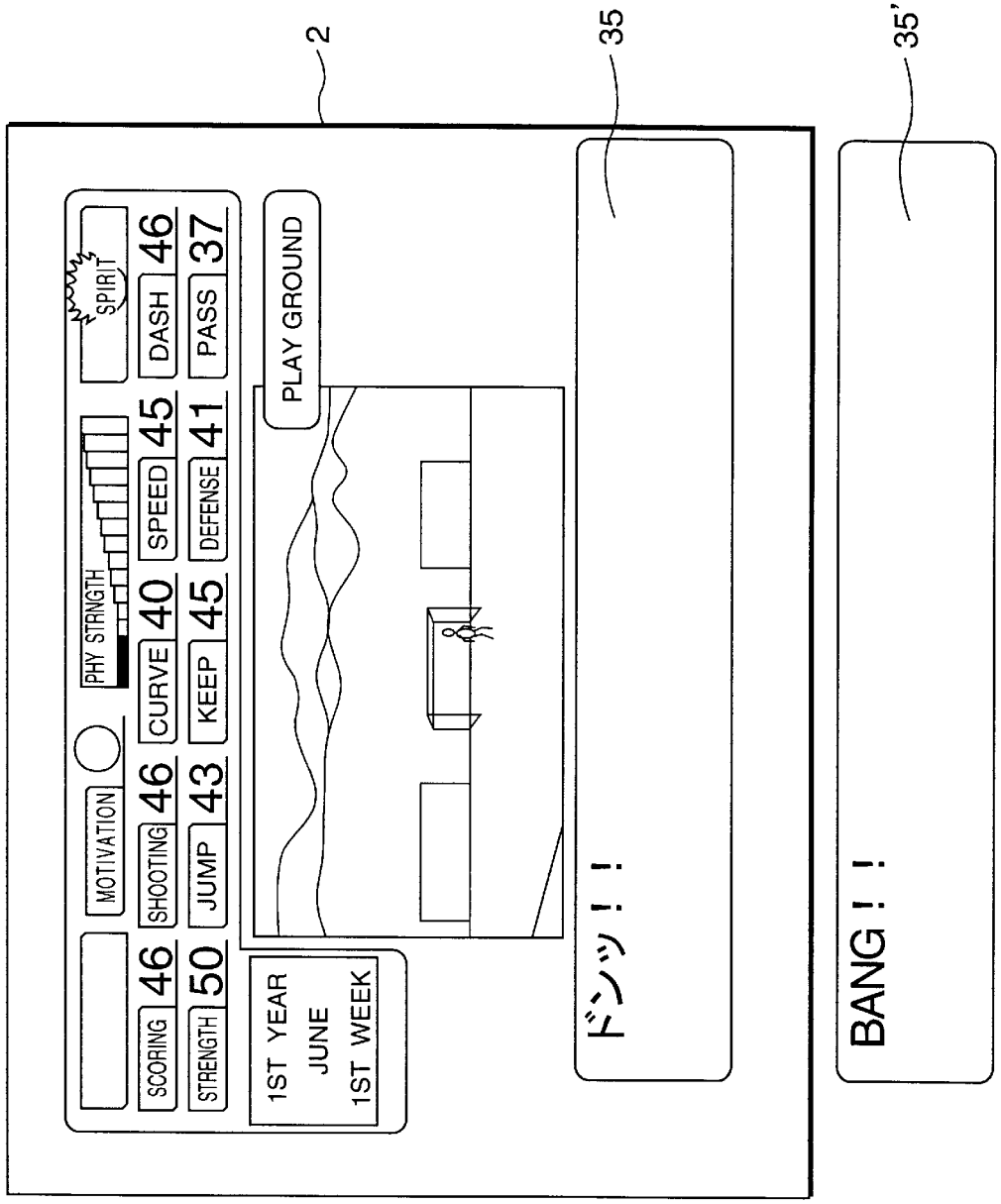

(7) FIGS. 31 and 32 show training scenes of the main character. In these scenes, the display position of the game content display frame 35 is reciprocated to the left and right. Further, the movement of the display position and the vibration of the vibration pack 16p are linked. Such an event that the main character who is not particularly displayed on the screen collides with something can be effectively expressed by vibrating the vibration pack 16 and laterally reciprocating the display position of the game content display frame 35 when imitating sounds representing a collision of the main character with something is displayed.

Figure 33:
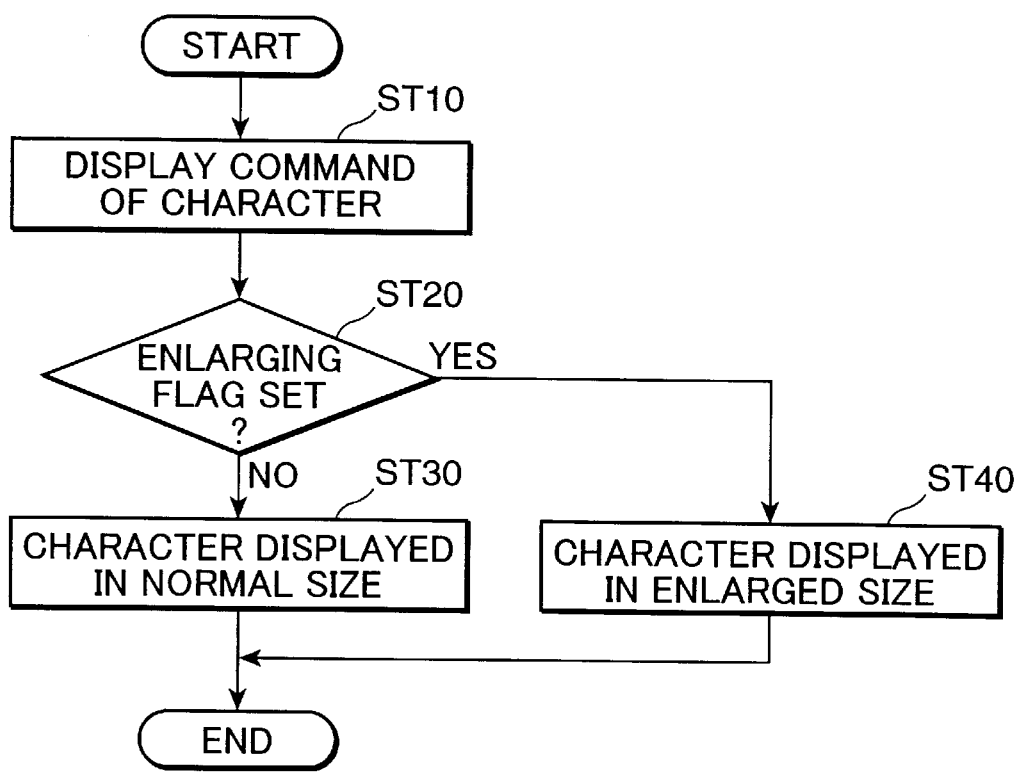
FIG. 33 is a flow chart showing an operation procedure of linking a sentence display control means and a display mode changing means.

Next, an operation procedure of the character enlargement display is described with reference to FIGS. 33 and 34. FIG. 33 is a flow chart showing a linking operation procedure of the sentence display control means 65 and the display mode changing means 67.

First, when the sentence display control means 65 receives a display command of one character from the game progress control means 61 (Step ST10), it is discriminated whether the character enlarging flag is set (Step ST20). Unless the character enlarging flag is set (NO in Step ST20), this character is displayed in a specified normal size by the sentence display control means 65 (Step ST30). If the character enlarging flag is set (YES in Step ST20), this character is enlargedly displayed by the display mode control means 67 (Step ST40).

FIG. 34 is a flow chart showing a procedure of the character enlargement display in the display mode changing means 67, i.e. a subroutine executed in Step ST40 of FIG. 33. First, upon receiving the character to be enlargedly displayed, the display mode changing means 67 enlargedly displays the received character, i.e. applies enlargement and reduction processings thereto (Step ST130) after saving the display position (coordinates) of this character at the time of the normal character display in the RAM 8 (Step ST120).

In the case that the characters are displayed in a wavy manner as shown in FIGS. 5 to 8, display coordinates (coordinates of the display positions of the characters) may be gradually changed character by character. In the case that the display coordinates are not changed as shown in FIGS. 10 to 14 and 18 to 20, only the enlargement and reduction processings may be applied.

If the display position of the character is determined by coordinate systems whose origin lies in the center of the character, the display position may be controlled based on the coordinates of the origin. On the other hand, if the display position of the character is determined by coordinate systems whose axes extend along horizontal (H) and vertical (V) directions and whose origin lies in an upper left point of the character, the display position of the character can be controlled by moving the origin with respect to the center of the display position according to the character size.

Subsequently, it is discriminated whether the character enlargement display processing has been completed (Step ST140). Unless this processing has been completed (NO in Step ST140), this routine returns to Step ST110 to process the next character. On the other hand, if the character enlargement display processing has been completed (YES in Step ST140), the character(s) being displayed as well as an information on the display position saved in the RAM 8 are transferred to the sentence display control means 65 (Step ST150).

According to this embodiment, when the content of speech of the human character and the specific sentence as an imitating sound relating to the content of speech are displayed in characters, the vibration pack 16p is vibrated and the characters are enlargedly displayed in the game content display frame 35. Thus, the human character's surprise and shock corresponding to the content of speech, etc. can be emphasized, with the result that the game can be made more interesting.

Although the present invention is applied to a player rearing game in this embodiment, it is not limited thereto and may be applied to such simulation games in which the content of the game corresponding to the progress of the game is displayed in sentence(s).

As described above, the inventive video game system in which the game progresses in accordance with the preset scenario comprises the display means for displaying the game screens, the sentence storage means for storing various sentences representing the contents of the game in compliance with the above scenario, the sentence display control means for displaying the sentences in characters on the display means to thereby express the progress of the contents of the game, the display mode changing means for changing the display mode of the characters to be displayed on the display means when the specific character display is executed by the sentence display control means, the vibrating member mounted on the operable means to be held by a game player, the vibration control means for vibrating the vibrating member, and the link control means for linking the change of the display mode of the character display and the vibration of the vibrating member.

In the video game system thus constructed, various sentences representing the contents of the game in compliance with the above scenario are stored, the progress of the contents of the game is expressed by displaying the sentences in characters on the display means, and the display mode of the characters on the display mode is changed when the specific character display is executed. Further, the content of the game corresponding to the displayed sentence can be emphasized by linking the change of the display mode of the characters and the vibration of the vibrating member mounted on the operable means held by the game player, with the result that the video game can be made more interesting.

The sentence storage means may store sentences representing the contents of speech including the lines of the human characters who appear in the game. With such a sentence storage means, the change of the display mode of the characters and the vibration of the vibrating member are linked when the specific one of the contents of speeches including the lines of the human characters who appear in the game are displayed in characters. In this way, the contents of speeches of the human characters can be emphasized, thereby making the video game more interesting.

The sentence storage means may store sentences representing imitating sounds relating to the contents of speeches of the human characters who appear in the game. With such a sentence storage means, the human characters' conducts and states resulting from such conducts can be emphasized, thereby making the video game more interesting.

The sentence display control means may execute the character display by successively adding the characters one by one to be displayed on the display means, and the display mode changing means may change the size of the character being displayed. With this construction, the characters being displayed can be strongly impressed to the game player by displaying the sentence through the successive one-by-one addition of the characters and changing the sizes of the characters being displayed. As a result, the content of the game corresponding to the displayed sentence can be emphasized.

The display mode changing means may reduce the size of the character being displayed after enlarging it. With this construction, the characters being displayed can be more strongly impressed to the game player.

The sentence display control means may add the characters to be displayed at specified intervals, and the display mode changing means may change the specified intervals when the sizes of the characters are changed. With this construction, a change in the sizes of the characters can be clarified character by character, thereby further emphasizing the content of the game.

There may be further provided the forward button provided on the operable means, the timer means for counting the lapse of time and the forwarding control means. The sentence display control means may display the characters over a plurality of lines by starting the character display for the next line when counting of a specified period by the timer means is completed following the character display end timing for one line. The forwarding control means forcibly ends the counting by the timer means when the forward button is operated, and the display mode changing means stops the function of the forwarding control means when the sizes of the characters are changed.

With this construction, the characters are displayed over a plurality of lines by starting the character display for the next line when the counting of the specified period by the timer means is completed following the character display end timing for one line, and the counting of the timer means is forcibly ended when the forward button is operated. Thus, the characters can be continuously displayed over a plurality of lines according to the game player's taste. On the other hand, when the sizes of the characters are changed, the counting by the timer means is not forcibly ended even if the forward button is operated. Therefore, the characters are displayed over a plurality of lines at the intervals of the specified period, with the result that the change in the sizes of the characters can be securely emphasized.

There may be further provided the frame display control means for displaying the character display frame enclosing the characters displayed by the sentence display control means on the display means, and the frame display mode changing means for changing the display mode of the character display frame, and the link control means may link the vibration of the vibrating member and the change of the display mode of the character display frame.

With this construction, the content of the game corresponding to the displayed sentence can be further strongly emphasized by displaying the character display frame enclosing the characters displayed on the display means and linking the vibration of the vibrating member and the change of the display mode of the character display frame. As a result, the video game can be made more interesting.

The frame display mode changing means may reciprocate the display position of the character display frame. With such an arrangement, the content of the game corresponding to the displayed sentence, e.g. the human character's collision or surprise and his shock resulting from such collision or surprise can be further strongly emphasized by linking the vibration of the vibrating member and the reciprocation of the display position of the character display frame.

The frame display mode changing means may change the shape of the character display frame. With such an arrangement, the content of the game corresponding to the displayed sentence can be more strongly emphasized by linking the vibration of the vibrating member and the change of the shape of the character display frame.

The inventive display method for the game in which the game progresses in accordance with the preset scenario comprises the display means for displaying the game screens comprises the steps of expressing the progress of the contents of the game by displaying various sentences representing the contents of the game in compliance with the scenario in characters, and linking the vibration of the vibrating member mounted on the operable means to be held by a game player and the change of the display mode of the characters displayed on the display means when the specific character display is executed.

According to this method, the content of the game corresponding to the displayed sentence can be emphasized by expressing the progress of the contents of the game by displaying various sentences representing the contents of the game in compliance with the scenario in characters, and linking the vibration of the vibrating member and the change of the display mode of the characters displayed on the display means when the specific character display is executed. Thus, the video game can be made more interesting.

The inventive readable storage medium stores the display program of the video game in which the game progresses in accordance with the preset scenario in order to cause the computer to realize the character display function of expressing the progress of the contents of the game by displaying various sentences representing the contents of the game in compliance with the scenario in characters, the vibrating function of vibrating the vibrating member mounted on the operable means to be held by a game player, the display mode changing function of changing the display mode of the characters to be displayed on the display means when the specific character display is executed, and the linking function of linking the vibration of the vibrating member and the change of the display mode of the characters to be displayed.

By letting the computer read the readable storage medium and implementing the display program stored therein, the content of the game corresponding to the displayed sentence can be emphasized by expressing the progress of the contents of the game by displaying various sentences representing the contents of the game in compliance with the scenario in characters, and linking the vibration of the vibrating member and the change of the display mode of the characters displayed on the display means when the specific character display is executed. Thus, the video game can be made more interesting.

This application is based on a Japanese Patent Application Serial No. HEI 11-211014 filed on Jul. 26, 1999, thus the contents of which are enclosed by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A video game system in which the game progresses in accordance with a preset scenario comprising:
   display means for displaying a game screens;
   sentence storage means for storing various sentences representing contents of the game in compliance with the scenario;
   sentence display control means for displaying the sentences which are represented as graphic characters on the display means to thereby express an emotional state of the game character in the progress of the contents of the game;
   display mode changing means for changing a display mode of the graphic characters to be displayed on the display means to effect a change in a nature of the graphic characters when a specific emotional state of the game character is represented by the sentence display control means;
   a vibrating member mounted on an operable means adapted for being held by a game player; a vibration control means for vibrating the vibrating member; and
   a link control means for linking change of the display mode of the graphic characters and vibration of the vibrating member such that said vibrating member is vibrated in conjunction with said change in the nature of the graphic characters.

2. The video game system according to claim 1, wherein the sentence storage means stores sentences representing the contents of speech including the lines of a human character appearing in the game.

3. The video game system according to claim 1, wherein said sentence storage means stores sentences representing imitating sounds relating to the contents of speeches of a human character appearing in the game.

4. The video game system according to claim 1, wherein the sentence display control means executes the graphic character display by successively adding graphic characters one by one to be displayed on the display means, and the display mode changing means changes the size of the graphic character being displayed.

5. The video game system according to claim 4, wherein the display mode changing means reduces the size of the graphic character being displayed after enlarging the size thereof.

6. The video game system according to claim 4, wherein the sentence display control means adds the graphic characters to be displayed at specified intervals, and the display mode changing means changes the specified intervals when the sizes of the graphic characters are changed.

7. The video game system according to claim 1, further comprising frame display control means for displaying the character display frame encircling the graphic characters displayed by the sentence display control means on the display means, and frame display mode changing means for changing the display mode of the graphic character display frame, and the link control means links the vibration of the vibrating member and the change of the display mode of the graphic character display frame.

8. The video game system according to claim 7, wherein the frame display mode changing means reciprocatingly moves the display position of the graphic character display frame.

9. The video game system according to claim 7, wherein the frame display mode changing means changes the shape of the graphic character display frame.

10. The video game system according to claim 7, wherein the frame display mode changing means reciprocatingly and laterally moves the display position of the graphic character display frame.

11. The video game system according to claim 7, wherein the frame display mode changing means reciprocatingly moves the display position of the graphic character display frame encircling the sentences representing the contents of the speech made by a single human character.

12. A video game system in which the game progresses in accordance with a preset scenario comprising:
   a display means for displaying a game screens;
   a sentence storage means for storing various sentences representing contents of the game in compliance with the scenario;

a sentence display control means for displaying the sentences by characters on the display means to thereby express the progress of the contents of the game, the sentence display control means executing the displaying of the sentences by the characters by successively adding characters one by one to be displayed on the display means;

a display mode changing means for changing a display mode of the characters to be displayed on the display means when a specific character display is performed by the sentence display control means, the display mode changing means changing the size of the character being displayed;

a vibrating member mounted on an operable means adapted for being held by a game player; a vibration control means for vibrating the vibrating member;

a link control means for linking change of the display mode of the character display and vibration of the vibrating member;

a forward button provided on the operable means;

a timer means for counting a time lapse; and a forwarding control means, wherein the sentence display control means displays the characters over a plurality of lines by starting the character display for the next line when counting of a specified period by the timer means is completed following the character display end timing for one line, and the forwarding control means forcibly ends the counting by the timer means when the forward button is operated, and the display mode changing means stops the function of the forwarding control means when the sizes of the characters are changed.

13. A display method for a game in which the game progresses in accordance with a preset scenario having a display means for displaying the game screens, the method comprising the steps of:

expressing the progress of the contents of the game by displaying various sentences which are represented as graphic characters representing contents of the game in compliance with the preset scenario; and linking vibration of a vibrating member mounted on an operable means adapted for being held by a game player and change of the display mode of characters on the display means to effect a change in a nature of the graphic characters when a specific graphic character display is performed corresponding to a specific emotional state of a game character.

14. A readable storage medium stores a display program of a video game in which the game progresses in accordance with a preset scenario in order to cause a computer to realize:

a character display function for expressing an emotional state of the game character in a progress of contents of the game by displaying various sentences representing the contents of the game in compliance with the scenario, said sentences being represented as graphic characters;

a vibrating function for vibrating a vibrating member mounted on an operable means adapted for being held by a game player;

a display mode changing function for changing a display mode of the graphic characters to be displayed on a display means to effect a change in a nature of the graphic characters when a specific emotional state of the game character is represented by the graphic characters; and a linking function for linking vibration of the vibrating member and change of the display mode of the graphic characters to be displayed such that said vibrating member is vibrated in conjunction with said change in the nature of the graphic characters.

15. A video game system in which the game progresses in accordance with a preset scenario comprising:

display means for displaying a game screens;

sentence storage means for storing various sentences representing contents of the game in compliance with the scenario;

sentence display control means for displaying the sentences which are represented as graphic characters on the display means to thereby express shock experienced by a game character in the progress of the contents of the game;

display mode changing means for changing a display mode of the graphic characters to be displayed on the display means to effect a change in a nature of the graphic characters when the shock experienced by the game character is expressed by the sentence display control means;

vibrating member mounted on an operable means adapted for being held by a game player;

vibration control means for vibrating member; and link control means for linking change of the display mode of the graphic characters and vibration of the vibrating member such that said vibrating member is vibrated in conjunction with said change in the nature of the graphic characters.

* * * * *